(12) United States Patent
Bernal et al.

(10) Patent No.: US 8,077,357 B2
(45) Date of Patent: Dec. 13, 2011

(54) CONTENT-AWARE RESIZING OF UNIFORM ROSETTE COLOR HALFTONE IMAGES

(75) Inventors: Edgar Bernal, Webster, NY (US); Robert P Loce, Webster, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 714 days.

(21) Appl. No.: 12/242,183

(22) Filed: Sep. 30, 2008

(65) Prior Publication Data
US 2010/0079812 A1  Apr. 1, 2010

(51) Int. Cl.
*G06K 15/00* (2006.01)
*G06K 15/02* (2006.01)
*G06K 9/32* (2006.01)

(52) U.S. Cl. .................. 358/3.06; 358/1.2; 382/298

(58) Field of Classification Search .................. None
See application file for complete search history.

(56) References Cited

U.S. PATENT DOCUMENTS

| | | | |
|---|---|---|---|
| 4,149,194 A | 4/1979 | Holladay |
| 4,185,304 A | 1/1980 | Holladay |
| 4,811,115 A | 3/1989 | Lin et al. |
| 5,323,245 A | 6/1994 | Rylander |
| 5,371,612 A | 12/1994 | Sakamoto |
| 5,583,660 A | 12/1996 | Rylander |
| 5,799,112 A | 8/1998 | de Queiroz et al. |
| 6,734,991 B1 | 5/2004 | Schweid |
| 6,798,539 B1 | 9/2004 | Wang et al. |
| 6,839,152 B2 | 1/2005 | Fan et al. |
| 6,864,994 B1 | 3/2005 | Harrington |
| 7,239,430 B2 | 7/2007 | Shiau et al. |
| 7,747,107 B2 * | 6/2010 | Avidan et al. ................. 382/298 |
| 2006/0170975 A1 | 8/2006 | Wang |
| 2008/0130054 A1 | 6/2008 | Wang et al. |
| 2008/0130055 A1 | 6/2008 | Wang et al. |

OTHER PUBLICATIONS

Bernal et al., U.S. Appl. No. 12/242,036, filed simultaneously herewith, entitled "Content-Aware Halftone Image Resizing".

(Continued)

*Primary Examiner* — Charlotte M Baker
*Assistant Examiner* — Barbara Reinier
(74) *Attorney, Agent, or Firm* — Philip E. Blair; Fleit Gibbons Gutman Bongini & Bianco P.L.

(57) ABSTRACT

As provided herein, there are supplied teachings to systems and methods for resizing a digital uniform rosette halftone image composed of multiple colorant separations, by using uniform rosette halftone tile parameters. One approach entails receiving into a digital imaging system, a digital uniform rosette halftone image and a desired resizing factor for that digital uniform rosette halftone image. Subsequently the system will define uniform rosette cells within the color uniform rosette digital halftone image. From the defined uniform rosette cells, a number of uniform rosette halftone tile seams are determined for manipulation. The orientation of the number of uniform rosette halftone tile seams is dictated by the received desired resizing factor. An energy map of the digital uniform rosette halftone image is determined according to an energy metric derived from the multiple colorant separations. The energy of the number of uniform rosette halftone tile seams within the energy map is determined so as to provide indication of at least one low energy determined uniform rosette halftone tile seam. A resizing of the uniform rosette halftone image by manipulating the at least one low energy determined uniform rosette halftone tile seam is performed so as to obtain a resized uniform rosette halftone image. The resized uniform rosette halftone image may then be printed on a printer.

44 Claims, 10 Drawing Sheets

OTHER PUBLICATIONS

Bernal et al., U.S. Appl. No. 12/242,119, filed simultaneously herewith, entitled "Content-Aware Halftone Image Resizing Using Iterative Determination of Energy Metrics".

Bernal et al., U.S. Appl. No. 12/242,222, filed simultaneously herewith, entitled "Content-Aware Uniform Rosette Color Halftone Image Resizing Using Iterative Determination of Energy Metrics".

Avidan and Shamir, entitled "Seam Carving for Content-Aware Image Resizing", Mitsbubishi Electric Research Labs, ACM Transactions on Graphics, vol. 26, No. 3, SIGGRAPH 2007.

Rittner et al., entitled "New Tensorial Representation of Color Images: Tensorial Morphological Gradient Applied to Color Image Segmentation," SIBGRAPI 2007, XX Brazilian Symposium on Computer Graphics and Image Processing, 2007, pp. 45-52.

* cited by examiner

CONTENT-AWARE RESIZING OF UNIFORM ROSETTE COLOR HALFTONE IMAGES

CROSS-REFERENCE TO COPENDING APPLICATIONS

Attention is directed to copending applications filed concurrently herewith: U.S. application Ser. No.12/242,036, entitled "Content-Aware Halftone Image Resizing"; U.S. application Ser. No. 12/242,119, entitled "Content-Aware Halftone Image Resizing Using Iterative Determination of Energy Metrics"; and U.S. application Ser. No. 12/242,222, entitled "Content-Aware Uniform Rosette Color Halftone Image Resizing Using Iterative Determination of Energy Metrics"; the disclosure found in these copending applications is hereby incorporated by reference in their entirety. The appropriate components and processes of the above co-pending applications may be selected for the teaching and support of the present application in embodiments thereof.

BACKGROUND AND SUMMARY

The teachings herein are directed to a method and apparatus for resizing a color halftone image using uniform rosette halftone tile parameters.

Demands imposed by today's digital media handling in regards to document edit-ability, portability, and dynamic layout make simple solutions for image resizing obsolete. Consider that a document can be rasterized and halftoned for a particular print path. That document may be directed to a different printer, possibly years later when extracted from an archive, with different paper size capabilities and may require image editing, cropping and resizing of halftoned image content prior to printing on the given print engine. Color halftone images may generally be re-purposed to print on different paper sizes and require layout modifications and resizing. Printed color halftone images may be scanned in a setting such as at a digital copier, and a user may wish to modify the image attributes such as size, aspect ratio, or image content. Conventional resizing methods that utilize spatially consistent interpolation methods are unsuitable in this halftone image setting because interpolation methods introduce defects in color halftone image structure and such spatially consistent interpolation can distort image content.

To begin, consider the halftone image class of concern to the present teachings herein. With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding color spot is either printed or not printed at a specified location or pixel. Digital halftoning controls the printing of color spots, where the spatial averaging of the printed color spots by either a human visual system or a viewing instrument, provides the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel, if the required color tone level is darker than the given halftone threshold level, a color spot is printed at that specified pixel. Otherwise the color spot is not printed. The output of the screening process is a binary pattern of multiple small "dots," which are regularly spaced as is determined by the size, shape, and tiling of the halftone cell. In other words, the screening output, as a two-dimensionally repeated pattern, possesses two fundamental spatial frequencies, which are completely defined by the geometry of the halftone screen.

It is understood in the art that the distribution of printed pixels depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs," X-shapes, pinwheels, and pincushions, and actual printed dots can possess distortions and fragmentation of those idealized shapes introduced by digitization and the physical printing process. Various digital halftone screens having different shapes and angles are described in U.S. Pat. No. 4,149,194, the disclosure found therein is hereby incorporated by reference in its entirety.

A common problem that arises in digital color halftoning is the manifestation of moiré patterns. Moiré patterns are undesirable interference patterns that occur when two or more color halftone separations are printed over each other. Since color mixing during the printing process is a non-linear process, frequency components other than the fundamental frequencies and harmonics of the individual color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequency vectors. Due to nonlinear color mixing the difference in frequency vectors produces a beat frequency which will be visibly evident as a very pronounced moiré interference pattern in the output. To avoid, for example, two-color moiré patterns due to misalignment, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color separations, it is desirable to avoid any two-color moiré as well as any three-color moiré. It is well known that in the traditional printing industry that three halftone screens, which can be constructed by halftone cells that are square in shape and identical, can be placed at 15°, 45°, and 75°, respectively, from a point and axis of origin, to provide the classical three-color moiré-free solution.

However, for digital halftoning, the freedom to rotate a halftone screen is limited by the raster structure, which defines the position of each pixel. Since tan(15°) and tan(75°) are irrational numbers, rotating a halftone screen to 15° or 75° cannot be exactly implemented in digital halftoning. To this end, some methods have been proposed to provide approximate instead of exact moiré-free solutions. For example, in U.S. Pat. Nos. 5,323,245 and 5,583,660, this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612 discloses a moiré prevention method to determine screen angles and sizes that is usable solely for square-shaped, halftone screens.

U.S. Pat. No. 6,798,539 to Wang et al., discloses methods for using single-cell, non-orthogonal clustered-dot screens to satisfy the moiré-free conditions for color halftoning. The disclosure also provides methods that combine single-cell non-orthogonal clustered-dot screens and line screens for moiré-free color halftoning. Particularly, the selection of these single-cell halftone screens is determined by satisfying moiré-free conditions provided in the respective spatial or frequency equations. The disclosure found in U.S. Pat. No. 6,798,539 is hereby incorporated by reference in its entirety.

In U.S. Patent Application Publication No. 2006/0170975 A1, Wang discloses a moiré-free color halftone configuration for clustered dots. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly moiré free, as all the fundamentals and harmonic frequencies are multiples of and thus higher in frequency than the rosette fundamental frequency. The disclosure found in U.S. Patent Application Publication No. 2006/0170975 A1 is hereby incorporated by reference in its entirety In U.S. Patent Application Publication No. 2008/0130055 A1, Wang and Loce disclose a method and apparatus for moiré-free color halftone printing with up to four color image separations. The method and apparatus utilize a plurality of non-orthogonal halftone screens to produce outputs that are moiré free and form uniform periodic rosettes. The method and apparatus provide for defining a first and a second color halftone screen fundamental frequency vector for each of three halftone screens such that the halftone screen set output forms uniform hexagonal rosettes; then defining a fourth color halftone screen where a first fundamental vector of the fourth screen shares a fundamental frequency vector with one of said three halftone screens and a second fundamental frequency vector of the fourth screen shares a fundamental frequency vector with a different one of said three color halftone screens. The disclosure found in U.S. Patent Application Publication No. 2008/0130055 is hereby incorporated by reference in its entirety.

In U.S. Patent Application Publication No. 2008/0130054, Wang and Loce disclose a method and apparatus for moiré-free enhanced color halftone printing of color image separations for an arbitrary number of colorants. The method and apparatus utilizes a plurality of halftone screens, >4, to produce outputs that are moiré free and form hexagonal periodic rosettes. The relatively large number of screens can be used for enhanced printing applications, such as printing with high-fidelity colorants, light colorants, or special colorants, such as white, metallics and fluorescents. The method and apparatus provide for defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1} \pm V_{R2}|>f_{min}$; defining N halftone screens for colorants i=1, N, respectively possessing first and second frequency vectors $(V_{i1}, V_{i2})$, where no two screens possess identical fundamental frequency vector pairs; and selecting fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate must also satisfy one of the following: $V_{ik}=V_{R1}$, $V_{ik}=V_{R2}$, and $"V_{ik}|>2$ max $[|V_{R1}|, |V_{R2}|]$. The disclosure found in U.S. Pat. application 20080130054 is hereby incorporated by reference in its entirety.

A current practice for resizing an image is to perform some type of resampling interpolation of the input image to generate an output image with the desired number of samples in each dimension. But, resampling a color halftone image with an interpolator such as nearest-neighbor, linear, quadratic, or cubic can result in defects within the color halftone image. One particularly problematic defect is the introduction of gray levels that must be re-halftoned prior to printing, where the re-halftoning step creates an interference pattern with the input color halftone image structure. Another defect is the appearance of seams along columns or rows of pixels, where the resampled halftone samples have a local disturbance in phase with respect to the halftone frequency. Yet another defect associated with these resampling methods is that the aspect ratio of important image content can become distorted. For example, use of resampling to reduce the vertical dimension of an image can make people appear shorter and wider than they are in reality.

Another practice for resizing a color halftone image is simply to crop that image to the desired size. However, cropping can delete desired image content around the borders of the color halftone image.

The diversity and versatility of display devices today imposes new demands on digital media. For instance, designers must create different alternatives for web-content and design different layouts for different display and rendering devices. These demands have lead to development of increasingly sophisticated image resizing tools for continuous tone digital images. Avidan and Shamir, in "Seam Carving for Content-Aware Image Resizing" ACM Transactions on Graphics, Volume 26, Number 3, SIGGRAPH 2007, present a simple image operator called seam carving, that supports content-aware image resizing for both image reduction and image expansion. A seam is an optimal eight-connected path of pixels on a single image from top to bottom, or left to right, where optimality is defined by a low value of an image energy function. By repeatedly carving out or inserting seams in one direction, Avidan and Shamir can change the aspect ratio of an image. By applying these operators in both directions they can retarget the image to a new size. The selection and order of seams protect the content of the image, as defined by the energy function. Seam carving can also be used for image content enhancement and object removal. The seam carving method of Avidan and Shamir can support various visual saliency measures for defining the energy of an image, and can also include user input to guide the process. By storing the order of seams in an image they create multi-size images that are able to continuously change in real time to fit a given size.

The method of Avidan and Shamir cannot be readily applied to color halftone images because selecting low energy seams will result in visually undesirable pathological seams that travel between halftone dots or along chains of connected dots. Removing a low-energy seam that travels between halftone dots would only increase the local darkness in the region about the seam. Conversely, removing a low-energy seam that traveled along connected halftone dots will decrease local darkness in the region about the seam. In either case, the seams would appear as visible streaks and would quite likely be objectionable. For example a simple single separation input halftone image where the pixels are at 600 dpi (dots per inch) resolution, and the halftone is at 141 cpi (cells per inch) at 45° when resized by 10% in the horizontal direction by applying a low energy seam removal method directly on the halftone image caused undesirable streaks to appear in the image.

One further option for resizing a halftone image is to apply a descreening technique to the halftone image to remove the halftone dot structure and provide a continuous tone version of the image. The continuous tone version of the image could be resized using the method of Avidan and Shamir. After resizing, the image may be re-halftoned to finally produce a resized binary image. However, a key problem with that approach is that any such descreening technique tends to blur fine details within an image and the resulting image will have an excessively "soft" appearance. This softness problem will be particularly evident when applied in binary printer image paths and copier image paths that utilize a "copy dot" approach to reproduction. "Copy dot" refers to direct copying of a halftone image without descreening and rescreening. Resizing such a descreened image will induce a blurring that "copy dot" reproduction is intended to avoid.

As provided herein, there are supplied teachings to systems and methods for resizing a digital uniform rosette halftone image composed of multiple colorant separations, by using uniform rosette halftone tile parameters. One approach entails receiving into a digital imaging system, a digital uniform rosette halftone image and a desired resizing factor for the digital uniform rosette halftone image. Subsequently the system will define uniform rosette cells within the color uniform rosette digital halftone image. From the defined uniform rosette cells, a number of uniform rosette halftone tile seams are determined for manipulation. The orientation of the number of uniform rosette halftone tile seams being dictated by the received desired resizing factor. An energy map of the digital uniform rosette halftone image is determined according to an energy metric derived from the multiple colorant separations. The energy of the number of uniform rosette halftone tile seams within the energy map is determined so as to provide indication of at least one low energy determined uniform rosette halftone tile seam. A resizing of the uniform rosette halftone image by manipulating the at least one low energy determined uniform rosette halftone tile seam is performed so as to obtain a resized uniform rosette halftone image. The resized uniform rosette halftone image may then be printed on a printer.

Disclosed in embodiments herein is a method for resizing a digital uniform rosette halftone image composed of multiple colorant separations. The method provides receiving into a digital imaging system, a digital uniform rosette halftone image and a desired resizing factor for that digital uniform rosette halftone image. The system will then determine the uniform rosette halftone screen parameters for the digital uniform rosette halftone image. Uniform rosette cells within the digital uniform rosette halftone image from the determined uniform rosette halftone screen parameters are then defined. From the defined uniform rosette cells and determined uniform rosette halftone cell parameters, a number of uniform rosette halftone tile seams are determined for manipulation. The orientation of these uniform rosette halftone tile seams being dictated by the received desired resizing factor. An energy map of the digital uniform rosette halftone image is determined according to an energy metric derived from the multiple colorant separations. The energy of the number of uniform rosette halftone tile seams within the energy map is determined so as to provide indication of at least one low energy determined uniform rosette halftone tile seam. A resizing of the uniform rosette halftone image by manipulating the number of low energy determined uniform rosette halftone tile seams is performed to obtain a resized uniform rosette halftone image. The resized uniform rosette halftone image may then be printed on a printer.

Further disclosed in embodiments herein is an image forming method for resizing a digital uniform rosette halftone image composed of multiple colorant separations. The method entails receiving into a digital imaging system, a digital uniform rosette halftone image and a desired resizing factor for the digital uniform rosette halftone image. Uniform rosette cells within the digital uniform rosette halftone image are defined. From the defined uniform rosette cells, a number of uniform rosette halftone tile seams are determined for manipulation. The orientation of these uniform rosette halftone tile seams being dictated by the received desired resizing factor. Each colorant separation of the digital uniform rosette halftone image is descreened to provide descreened pixel values. An energy metric from the descreened pixel values is determined so as to provide an energy map. The energy of the number of uniform rosette halftone tile seams is determined according to an energy map, so as to indicate of a number of low energy determined uniform rosette halftone tile seams in sufficient number to at least to achieve the desired resizing factor for the digital uniform rosette halftone image. A resizing of the uniform rosette halftone image is performed by manipulating the number of low energy determined uniform rosette halftone tile seams, to obtain a uniform rosette resized halftone image. The resized uniform rosette halftone image may then be printed on a printer.

DETAILED DESCRIPTION

Figure 1:
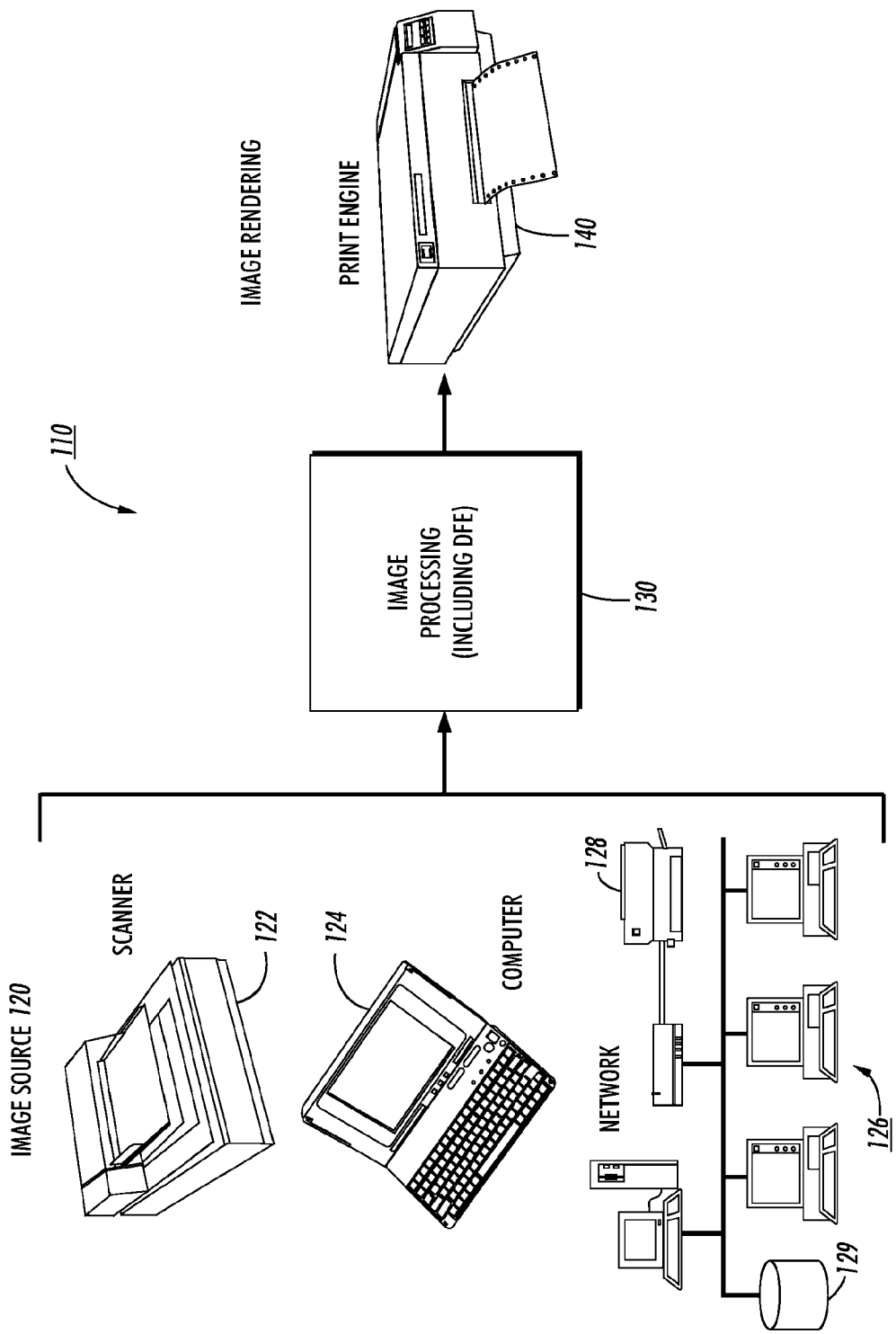
FIG. 1 depicts an exemplary embodiment of a digital imaging system suitable for one or more aspects of the present invention.

The teachings herein are directed to a method and apparatus for resizing a halftone image using uniform rosette halftone tile parameters. In particular, the teachings herein resize an image by manipulating uniform rosette halftone tiles or cells along low energy uniform rosette halftone tile seams. By using the tile parameters to define the low energy uniform rosette halftone tile seams, a uniform rosette color halftone image can be resized while avoiding the defects associated with applying known resizing methods directly to color halftone images.

In one embodiment of the teachings herein, a digital uniform rosette color halftone image is received and a region of the digital uniform rosette color halftone image is resized through manipulation (be it replication or deletion) of low energy uniform rosette halftone tile seams within the color halftone image. Uniform rosette halftone cell parameters are received or derived from analysis of the color halftone image. A resizing factor or factors are received and are used to determine if the manipulation is directed to replicate low energy uniform rosette halftone tile seams or delete low energy uniform rosette halftone tile seams, and to determine the orientation of the seam to be manipulated (vertical or horizontal). The resizing factor and the cell parameters are used to determine what number of low energy uniform rosette halftone tile seams need to be removed or duplicated.

The energy of uniform rosette halftone tile seams within the halftone region is determined using an energy metric, which is a measure of image activity within a local region. That energy metric may be derived on a pixel basis and spatially quantized to conform to uniform rosette halftone tiles, or it may be derived directly from the tiles. The energy metric may also be a function of descreened values of pixels within the uniform rosette halftone image region. This energy metric as determined for locations within the uniform rosette halftone image region is used to form an energy map.

The energy of the uniform rosette halftone tile seams is determined by using the energy map, where uniform rosette halftone tile seams are a connected path of cells that run either vertically or horizontally through the image region depending on the required resizing. The energy of a uniform rosette halftone tile seam is a function of the integrated energy along the path of the uniform rosette halftone tile seam. A number of low energy uniform rosette halftone tile seams will be manipulated, where the number depends on the resizing factor and the uniform rosette halftone cell parameters. Resizing factors greater than 1 are defined to require low energy uniform rosette halftone tile seam replication while resizing factors less than 1 require low energy uniform rosette halftone tile seam deletion.

The low energy uniform rosette halftone tile seams are manipulated according to their energy ranking, where uniform rosette halftone tile seams possessing lowest or relatively low energy are selected first for manipulation. A seam is considered a low energy seam if its energy is below a threshold, which may be a function of the energy level of the minimum energy seam. Low energy uniform rosette halftone tile seams can be manipulated either as a group, or the manipulation can be performed iteratively, where within the iterations, uniform rosette halftone tile seam energy is recomputed when one or more low energy uniform rosette halftone tile seams are removed or replicated, and the recomputed uniform rosette halftone tile seam energy is used for ranking and subsequent manipulation.

For a general understanding of the present invention, reference is made to the drawings. In the drawings, like reference numerals have been used throughout to designate identical elements. In describing the present invention, the following term(s) have been used in the description.

The term "cell" indicates consistent unit area and shape of pixels or halftone threshold values arrayed in manner that fills a region without forming gaps. In a monochrome image, for example black and white, or a single color separation, a cell refers to pixels or threshold values within a single spatial two-dimensional array. In a multi-separation uniform rosette color image (e.g., cyan, magenta, yellow, and black) a cell in the present context can refer to pixels or threshold values across the multiple separations.

The terms "tile" and "Holladay tile" are used synonymously within the present disclosure, and indicate cells that are rectilinear in shape, constructed of vertical sides and horizontal sides. Due to these characteristics they are convenient for use in horizontal or vertical resizing. In a monochrome image, for example black and white, or a single color separation, a tile refers to pixels or threshold values within a single spatial two-dimensional array. In a multi-separation color image (e.g., cyan, magenta, yellow, and black) a tile in the present context can refer to pixels or threshold values across the multiple planes.

There are several equivalent representations for the periodic structure of a halftone image. For example, parameters that describe the tiling of cells or parameters that describe the tiling of Holladay tiles both fully describe the halftone structure for an image. Thus, "cell parameters" and "tile parameters" and related representations described more fully below possess equivalent information and transformations may be made between the representations.

The term "uniform rosette" refers to a moiré-free hexagonal structure formed from the overlay of multiple halftone color separations, where the period and angle of the hexagonal structure are consistent throughout an image region. Uniform rosettes color halftones are described in U.S. Pat. No. 6,798,539 to Wang et al. Uniform rosettes color halftones are also described in U.S. Patent Application Publication No. 2008/0130055 A1 to Wang and Loce, and U.S. Patent Application Publication No. 2008/0130054 to Wang and Loce. Uniform rosette halftones are also described more full below.

"Descreening" refers to methods to remove the halftone dot structure or halftone rosette structure of an image to produce a continuous tone version of the image.

"Eight-connectivity" commonly refers to pixels that touch neighboring pixels either on a side or a corner, where it is understood that any flat edge of a tile or pixel is considered a side regardless of orientation. That is, if two pixels are adjacent, side-by-side or corner-touching, they are said to be eight-connected. We extend the definition of eight-connectivity of pixels, to cells of pixels to refer to a neighboring relationship between two cells where at least one pixel in the first cell is eight-connected to at least one pixel in the second cell. An "eight-connected path" is an unbroken string of eight-connected pixels or eight-connected cells.

A "seam" is an optimal eight-connected path of pixels on a given image from top to bottom, or left to right, where optimality is defined by a low value of an image energy function. A "low energy seam" is a seam possessing an energy metric that is below a threshold level. The threshold level can be a function of the energy level of the minimum energy seam, such as 20% greater than the energy level of the minimum energy seam.

In a monochrome image, "energy" refers to the variation in gray levels around a pixel or variation in halftone cell values around a halftone cell. In a uniform rosette halftone image, "energy" refers to the variation in a color metric around a pixel or variation in uniform rosette halftone cell values around a uniform rosette halftone cell. The color metric can be a measure within a perceptually uniform space, such as CIE Lab. Neighboring pixels or neighboring cells that have similar values possess low energy, while neighboring pixels or neighboring cells that possess very different values possess higher energy. An energy metric is a measure of energy, such as the sum of the magnitude of the gradient along an eight-connected path.

Within the field of halftoning, the term "screen" is sometimes used to denote an array of threshold values, and sometimes used to denote the periodic structure of a halftone image. Within the present disclosure we are not concerned with a halftoning process, so use of the term "screen" herein will denote the periodic halftone structure unless the context refers to a screening process.

In FIG. 1, as depicted therein is one embodiment of a digital imaging system suitable for one or more aspects of the present invention. In the system 110, image source 120 is used to generate image data that is supplied to an image processing system 130 (including a digital front end), and which produces output data for rendering by print engine 140. Image source 120 may include scanner 122, computer 124, network 126 or any similar or equivalent image input terminal. On the output end printer engine 140 is preferably a xerographic engine however print engine 140 may include such equivalent print technology alternatives as wax, ink jet, etc. The teachings presented herein are directed toward aspects of image processor 130 depicted in FIG. 1. In particular, the intention of the teachings presented herein is to identify, and render accordingly, seams within a digital image. It will be appreciated by those skilled in the art that the rendering of an image into a printable or displayable output format may be accomplished at any of a number of locations, which herein is provided for in but one example only as occurring within the image processing system 130 or within in the print engine 140.

Many applications can be envisioned within the system embodiment 110. For instance, consider that a document can be rasterized and halftoned by a computer 124 for a particular print path and printer 128. That document may be directed to a different printer 140, possibly years later when extracted from an archive 129, with different paper size capabilities and may require image editing, cropping and resizing of halftoned image content prior to printing on the given print engine. Halftoned images may be acquired from a scanner 120 or retrieved from an archive 129 as part of a document to be re-purposed. The document may be directed to print on different paper sizes, and may be redesigned with different layout requirements, thereby requiring resizing of its various elements, such as the halftone image. Printed halftone images may be scanned using a scanner 122 in a setting such as at a digital copier, and a user may wish to modify the image attributes such as size, aspect ratio, or image content prior to printing on a printer 140.

Figure 2:
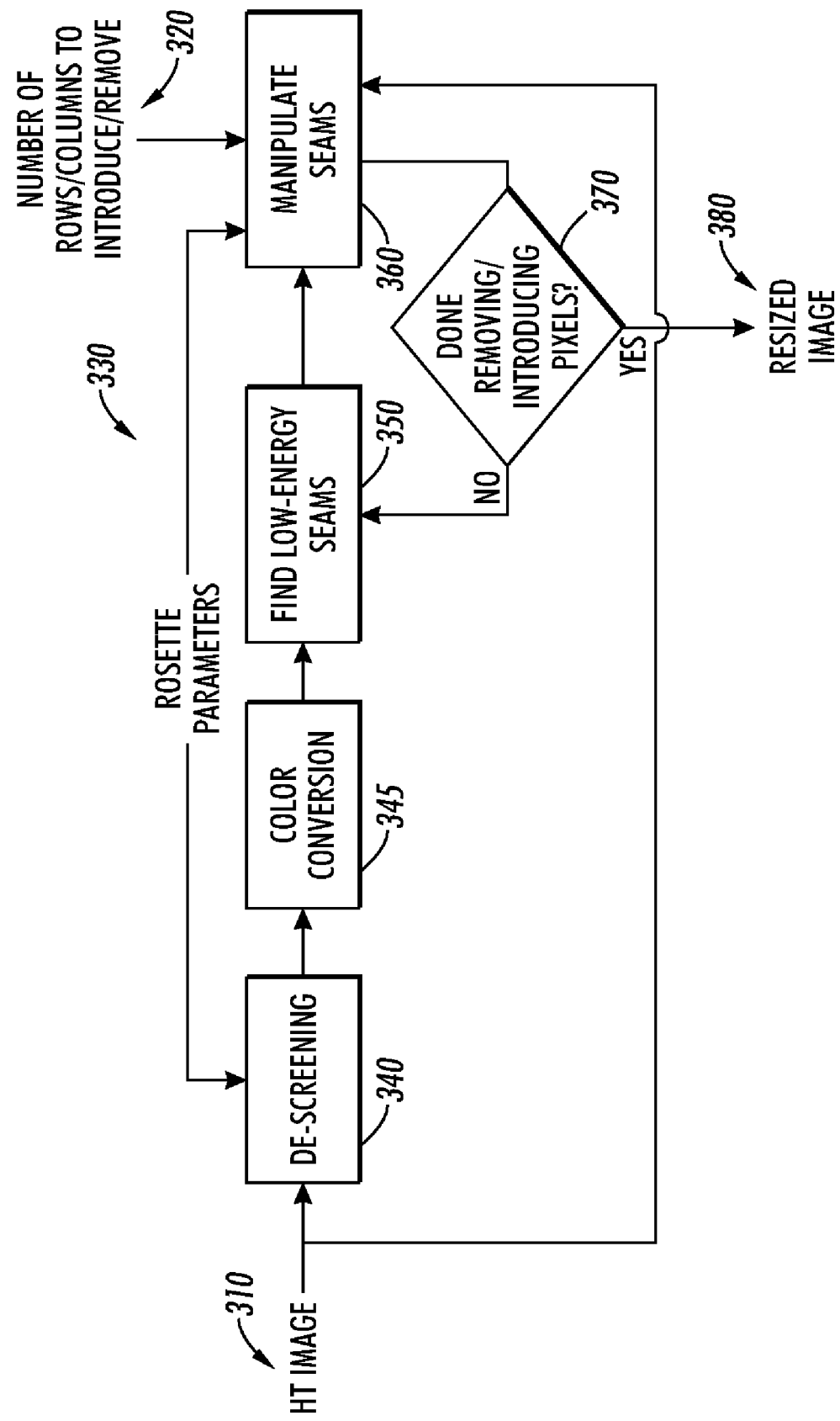
FIG. 2 Schematic depicting an embodiment of the method taught herein.

FIG. 2 provides a schematic for embodiments directed to the method taught herein. One embodiment of the method receives a uniform rosette color halftone image region 310 and a resizing factor or factors. A factor indicates a desired magnification change for a particular orientation (e.g., vertical or horizontal). The magnification factor corresponds to a number of rows or columns of pixels to be deleted or replicated. An alternative to receiving a magnification factor is directly receiving the number of rows or columns of pixels to be manipulated within the region 320. Uniform rosette halftone tile parameters can optionally be input or they can be estimated from the uniform rosette halftone image 330. The method applies a descreening operation 340 to the input uniform rosette halftone image to produce a continuous-tone image. Optionally, the descreened image values can be mapped from a device dependent color space to a perceptually uniform color space 345, which allows the energy metric to better correspond to perceived image activity. The descreening operation may use the uniform rosette halftone tile information so that the halftone rosette texture may be well removed. Seams are found within the contone image 350. The uniform rosette halftone tile seams are determined from connected uniform rosette halftone tiles or determined from connected pixels and converted to connected uniform rosette halftone tiles. The low energy seams of connected tiles (low energy uniform rosette halftone tile seams) are either removed or replicated 360 as needed in the input uniform rosette halftone image until 370 the desired resizing is achieved and a resulting rescaled uniform rosette halftone image is output 380.

Halftone tile parameters may be known in some image processing settings. For instance, in a binary printer image path, the Digital Front End (DFE) 130 of the print engine 140 may possess one or more halftone threshold arrays that are used to performed the halftoning operation. Knowledge of the halftone threshold arrays can provide the halftone tile information. If the halftone tile information is not known a priori, it can be derived via a frequency analysis. For instance, digital image processing analysis can be used to estimate the halftone cell parameters of a scanned halftone image in a digital copier setting. Various techniques have been applied to this estimation problem, such as finding the maximum of an auto-correlation or Fourier transform, or performing wavelet analysis. Examples of methods for estimating halftone parameters are taught by Schweid in U.S. Pat. No. 6,734,991, Shiau and Lin in U.S. Pat. No. 7,239,430, and Lin and Calarco in U.S. Pat. No. 4,811,115. The disclosure found in these patents is hereby incorporated by reference in its entirety.

Key to the present invention is an understanding of halftone periodic structures, halftoning tiling and halftone tile parameters. We first discuss uniform rosette halftoning, then describe cell representations.

The four plots in FIGS. 6-9 provide examples of uniform rosette halftones and their respective spatial frequency representations, which will be used to teach the concepts of uniform rosette halftoning. The halftones are shown on the left and frequency representations on the right. Of course, the halftones possess many higher order harmonics that are not shown in the plots due to limiting the range of the plots to ±300 cycles-per-inch (cpi) in both directions to simplify the plots for teaching the relevant concepts.

Figure 6:
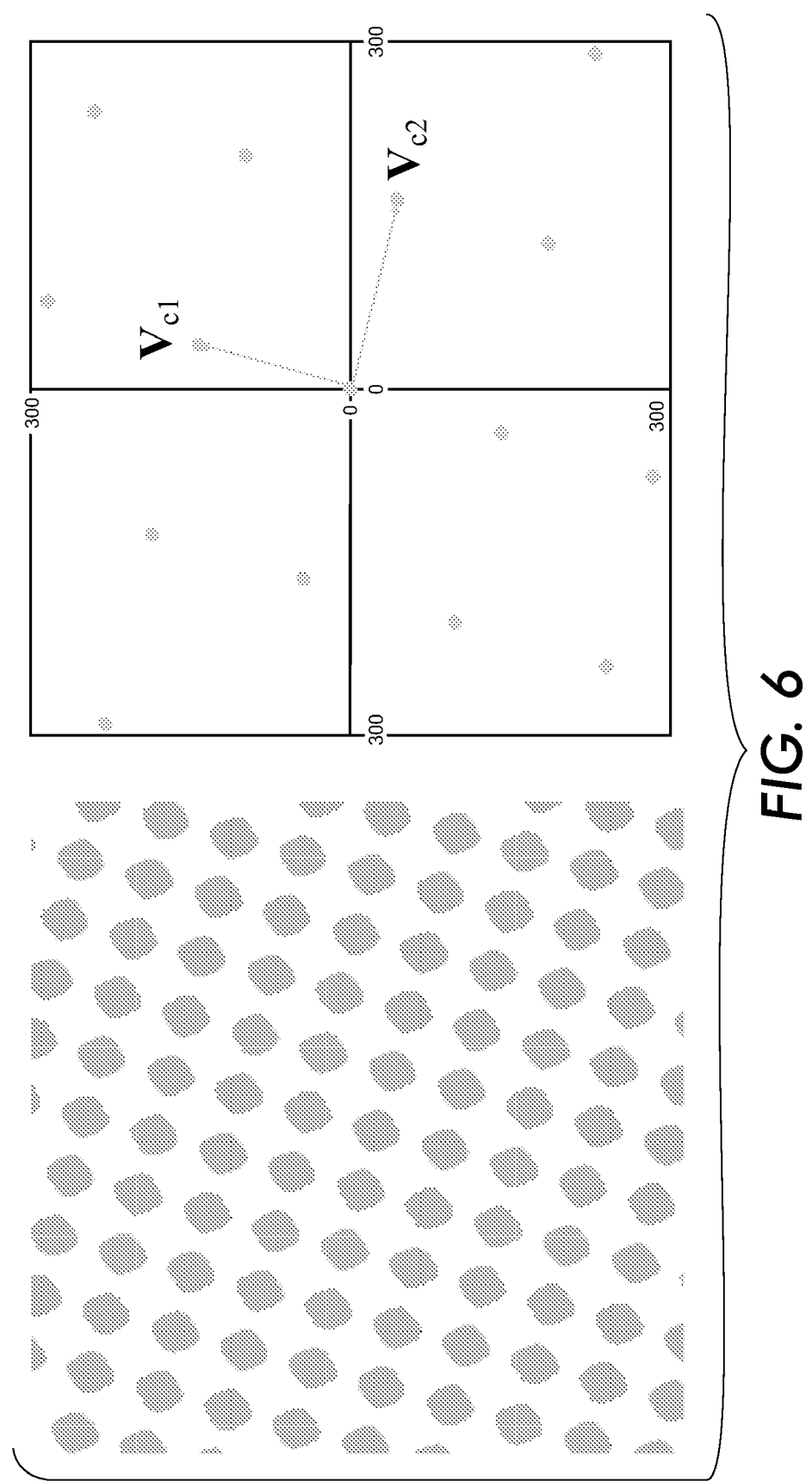
FIG. 6 depicts an exemplary cyan halftone pattern and its Fourier representation.
Figure 7:
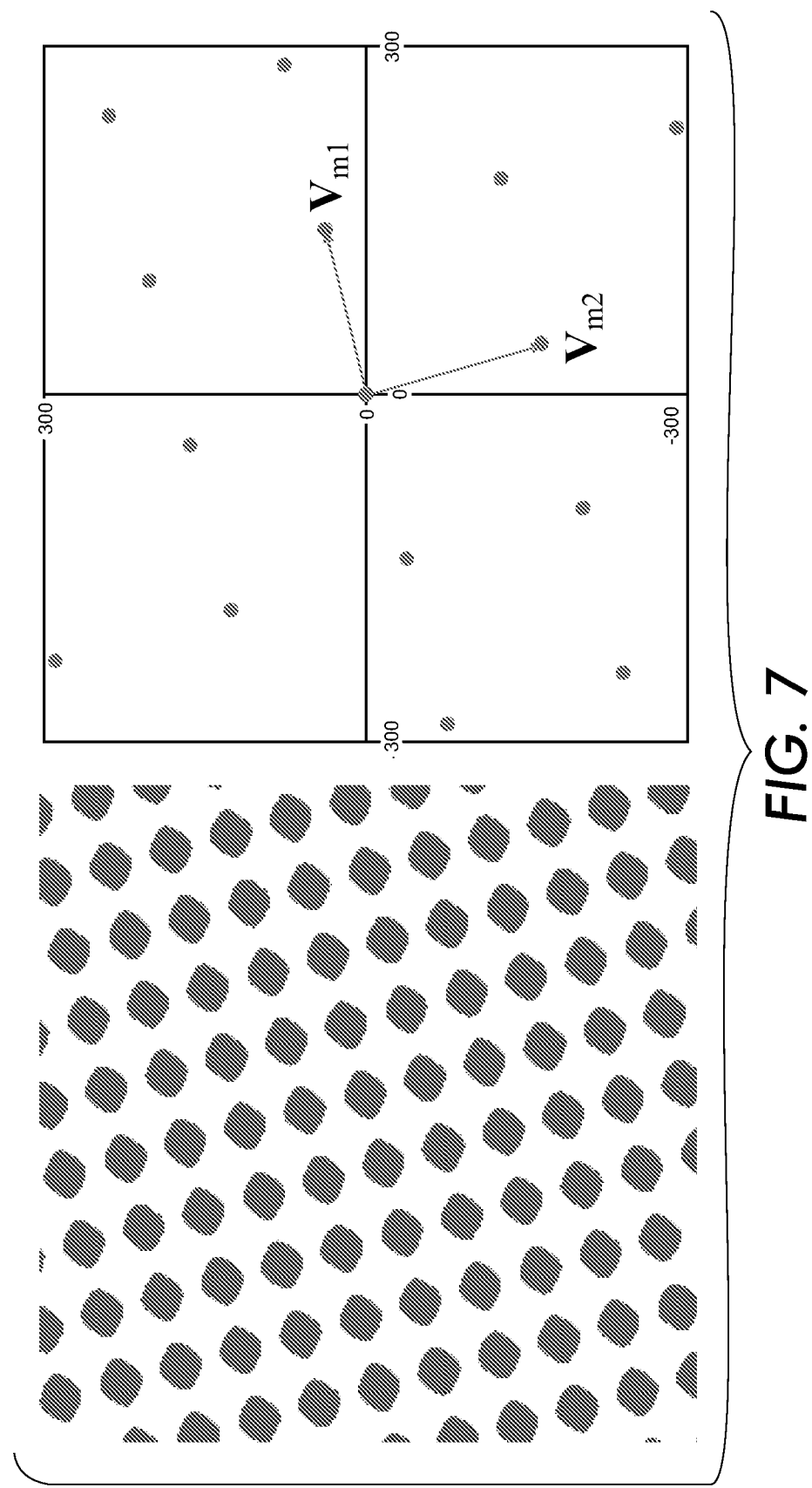
FIG. 7 depicts an exemplary magenta halftone pattern and its Fourier representation.
Figure 8:
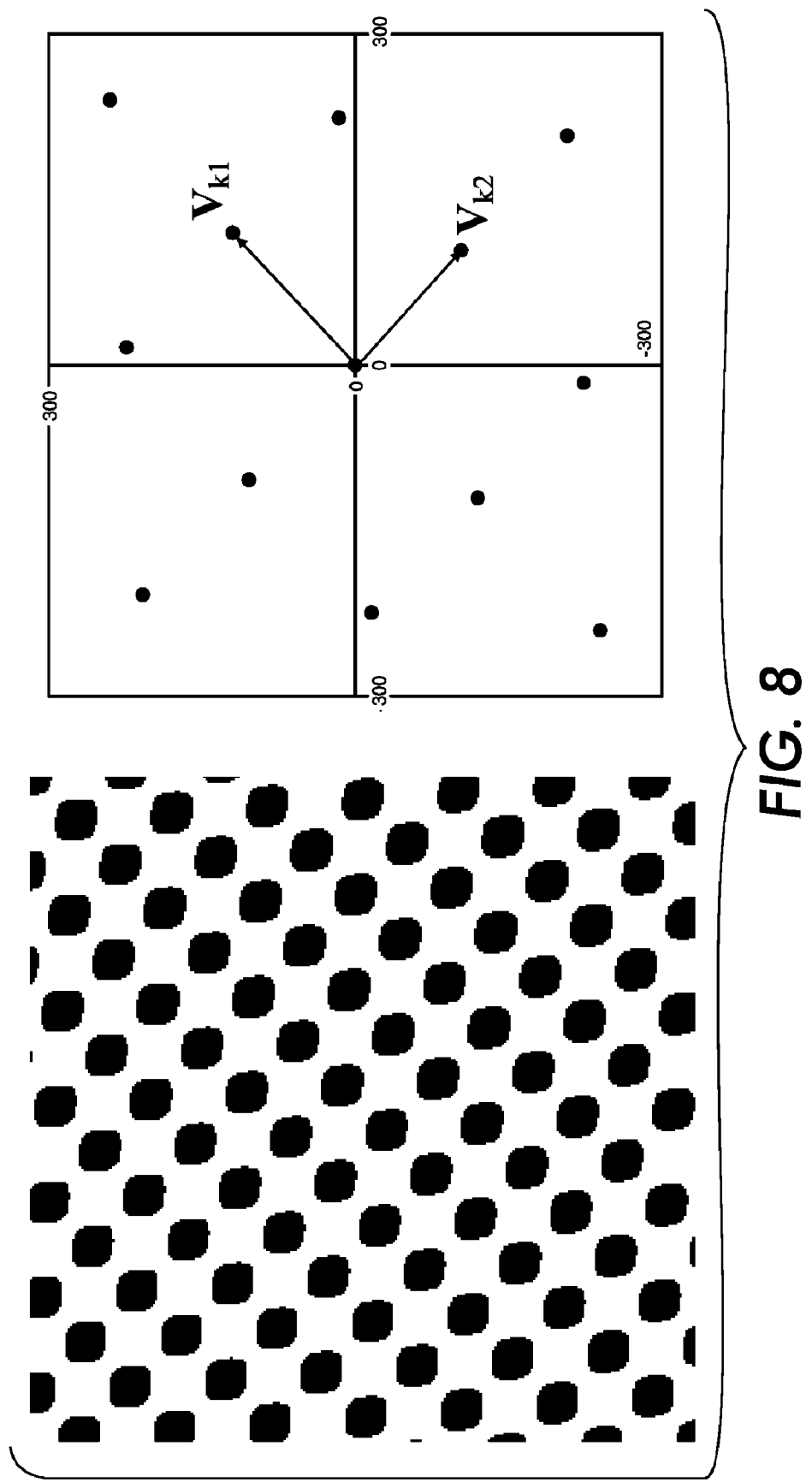
FIG. 8 depicts an exemplary black halftone pattern and its Fourier representation.

Most screening-based halftone methods use halftone screens in a two-dimensional tiling manner. Thus the corresponding halftone outputs possess strong periodic structures defined by the halftone screens. Images can be also described by their Fourier transforms or their spatial frequency representations. As the result of tiling halftone screens, Fourier transforms of the halftone patterns in FIGS. 6-8 are dominated by discrete frequency components defined by the two fundamental halftone frequency vectors for each screen and their two-dimensional higher-order harmonics, or linear combinations of the fundamentals. For the following discussion in this specification, we use the notation illustrated by the transform plots in FIGS. 6-8 to represent the Fourier transform of halftone patterns. Only the locations of the fundamental halftone frequency vectors, $V_{c1}$, $V_{c2}$, $V_{m1}$, $V_{m2}$, $V_{k1}$, and $V_{k2}$, and some of their harmonics are shown in the spatial frequency coordinates as circular dots, and the amplitude and phase of each component are ignored in these illustrations. The sub 1 and sub 2 notation refers to vectors that are above (0° to 90°) or below (270° to 360°, or equivalently −90° to 0°) the 0° axis, respectively. We use this notation consistently within the present disclosure to represent the two quadrants. Unless otherwise noted, we use the subscripts c, m, y, and k, to aid in teaching the presently described halftoning processes due to the common practice of four-color printing with cyan, magenta, yellow, and black. While we teach using that notation, the concepts are general in that other colorants may be used. For example, we may use the notation $V_{m1}$ and use examples that refer to it as a frequency vector for the magenta screen, but it is to be understood that we intend it to generally imply a frequency vector in the first quadrant for some available colorant. Further, we note that colorants for particular screen geometries are interchangeable. For example, we may teach with yellow halftoned with a screen of a first geometry, and black halftoned with a screen of a second geometry, but it is practical and reasonable to assume that the screens may be interchanged and yellow may be halftoned with the screen of the second geometry and black the first.

In color printing, more frequency components than the fundamental frequencies are typically created in the halftone image due to the superimposition of halftone screens for different process colors. Using Fourier analysis, we can express the result caused by such superimposition of two different colors as their frequency-vector difference, e.g., $V_{cm} = V_c \pm V_m$, where $V_x$ represents any of $V_{x1}$, $-V_{x1}$, $V_{x2}$, $-V_{x2}$, and $V_{cm}$ is the combined vector. The sign definition of frequency vectors is rather arbitrary since each Fourier component has its conjugate, i.e., there is always a frequency vector $-V_c$ that represents the conjugate component of $V_c$. For each halftone dot screen, there are two fundamental frequency vectors, thus the color mixing of two screens for two different colors yields eight unique combined vectors for the fundamental frequency vectors alone. Without judicious design procedures, one or more combined vectors can occur at relatively low frequencies and possess an objectionable appearance known as moiré.

The common strategy to avoid objectionable two-color moiré is to select frequency vectors that ensure that no two-color difference vector of the fundamental halftone frequency vectors is sufficiently small, or short in length, to be perceived as a noticeably low frequency. The two-color moiré-free condition can be summarized by $$|V_c \pm V_m| > V_{high}, \quad (1)$$

where $V_c$ represents any one of $V_{c1}$, $-V_{c1}$, $V_{c2}$, $-V_{c2}$; $V_m$ represents any one of $V_{m1}$, $-V_{m1}$, $V_{m2}$, $-V_{m2}$; and $V_{high}$ is a frequency limit set at somewhere between 50-70 cycles-per-inch for just noticeable moiré.

It is well known that a troublesome moiré is the three-color moiré, which can appear in cyan-magenta-black prints produced by CMYK four-color printers. As an extension of the two-color case, one aspect of the three-color moiré-free condition can be summarized by $$|V_c \pm V_m \pm V_k| > V_{high}, \quad (2)$$

where $V_k$ represents any one of $V_{k1}$, $-V_{k1}$, $V_{k2}$, $-V_{k2}$; and $V_{high}$ is set similar to the two-color case. Since there are altogether thirty-two unique combinations of different color components for the left side of the inequality of Equation (2), it stands as a matter of practicality that to make all three-color difference vectors as well as all two-color difference vectors large enough to avoid any color moiré is very difficult, unless the halftone screens have very high frequency fundamentals, say higher than 200 line-per-inch. Another aspect of the moiré-free condition is to make two of the three-color difference vectors null while keeping the rest large. Given that both the signs and the indices of frequency vectors are defined somewhat arbitrarily, without losing the generality, the three-color moiré-free condition can be specified by the following vector equation:

$$V_{c1} - V_{m1} + V_{k2} = 0, \quad (3a)$$

or, equivalently due to the conventional screen configuration, $$V_{c2} - V_{m2} - V_{k1} = 0 \quad (3b)$$

The Equations (3a) and (3b), are two of all possible frequency combinations of the three colors. In most practical applications, the rest of the combinations satisfy the inequality of Equation (2) for $V_{high}$ as large as $MIN[|V_c|, |V_m|, |V_k|]$ and are not specially specified, and the combination of halftone outputs produce a rosette appearance rather than objectionable moiré.

Most conventional halftone screens use square-shape halftone cells for tiling. Therefore, the two fundamental frequency vectors of each screen are not independent to each other. Once one of the two equations, either (3a) or (3b) is satisfied, the other one is automatically held. Recently, Wang et al. has taught halftone methods (U.S. Pat. No. 6,798,539, Wang et al. as incorporated by reference above) using non-orthogonal halftone cells to construct halftone screens, or general parallelogram-shape halftone cells, for moiré-free color halftoning, in which case the two fundamental frequency vectors of each parallelogram-shape-based screen are independent to each other and thus satisfying both Equations (3a) and (3b) is required for the three-color moiré-free condition. We note that the term "non-orthogonal" as used in the present specification here refers to "not necessarily square," which is less restrictive than "strictly not orthogonal." Such terminology follows convention used in mathematics, where terms such as "non-linear" refers to "not necessarily linear."

Further concerning moiré-free non-orthogonal halftone configurations, Wang, in US Publication No. 2006/0170975 A1, disclosed a moiré-free color halftone configuration for clustered dots. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly moiré free, as all the fundamentals and harmonic frequencies are multiples of and thus higher in frequency than the rosette fundamental frequency.

An example of a hexagonal rosette halftone configuration is easy to understand through extension of the classical screen configuration. Assume halftone screens rotated to 15°, 45°, and 75°, respectively, for three different colors. In the present example, the halftones screens will satisfy Equation (3), but will be constructed of rectangular cells, rather than square cells. The monochromatic halftone outputs of this configuration, shown as C, M and K halftone patterns, and their spectra are shown in FIGS. 6, 7, and 8, respectively. The repeated halftone pattern for each separation of this configuration is a rectangular cell with a ratio between the lengths of the two sides equal to 0.866, or exactly cos(30°). The frequency representations of the halftone patterns show that fundamental frequencies vectors of each pattern are perpendicular to each other and the ratio of the two frequencies are also equal to cos(30°).

Figure 9:
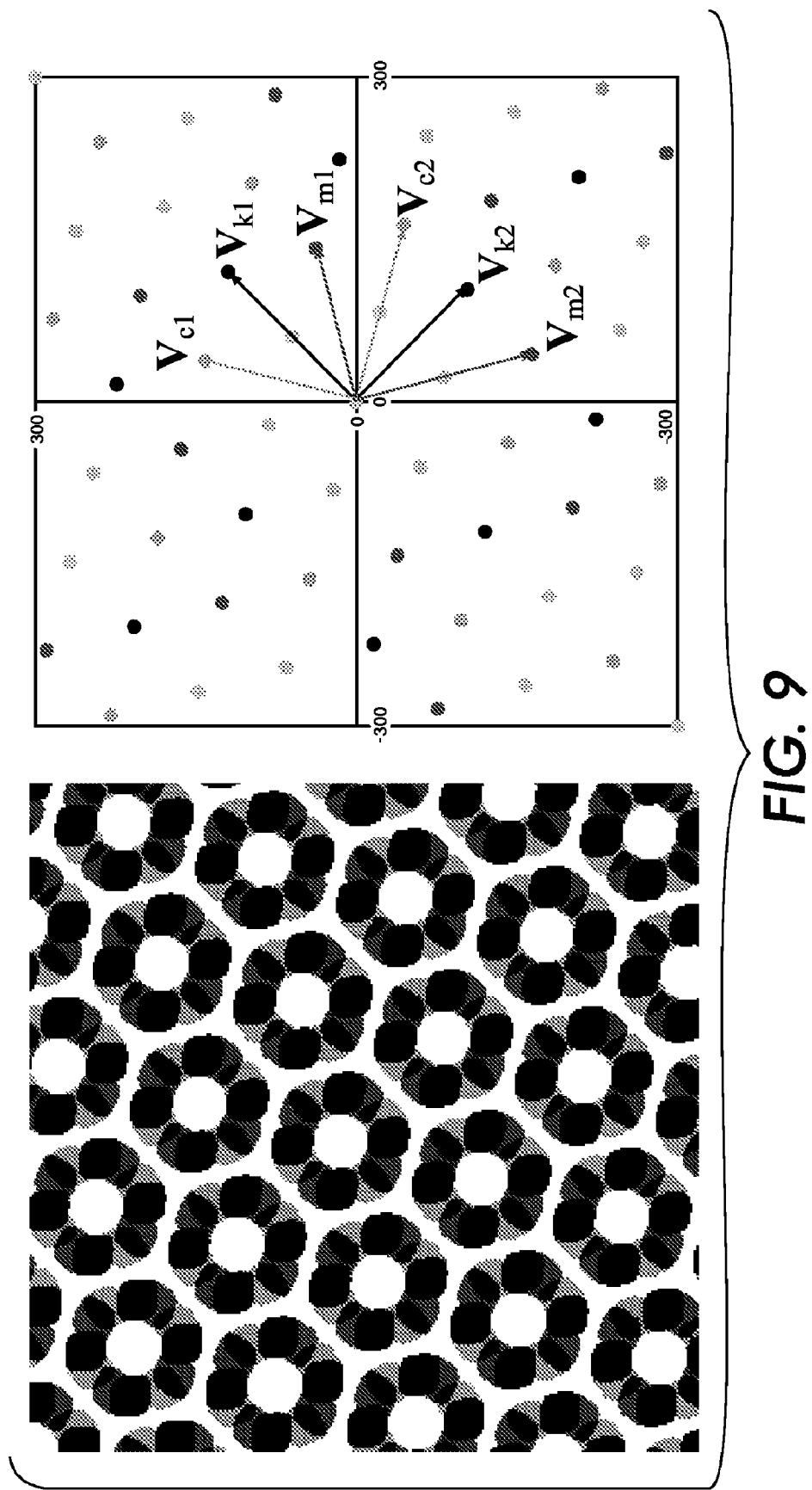
FIG. 9 depicts the superimposition of exemplary cyan, magenta, and black halftone patterns, with the corresponding Fourier representation for that exemplary superimposition along-side.
Figure 10:
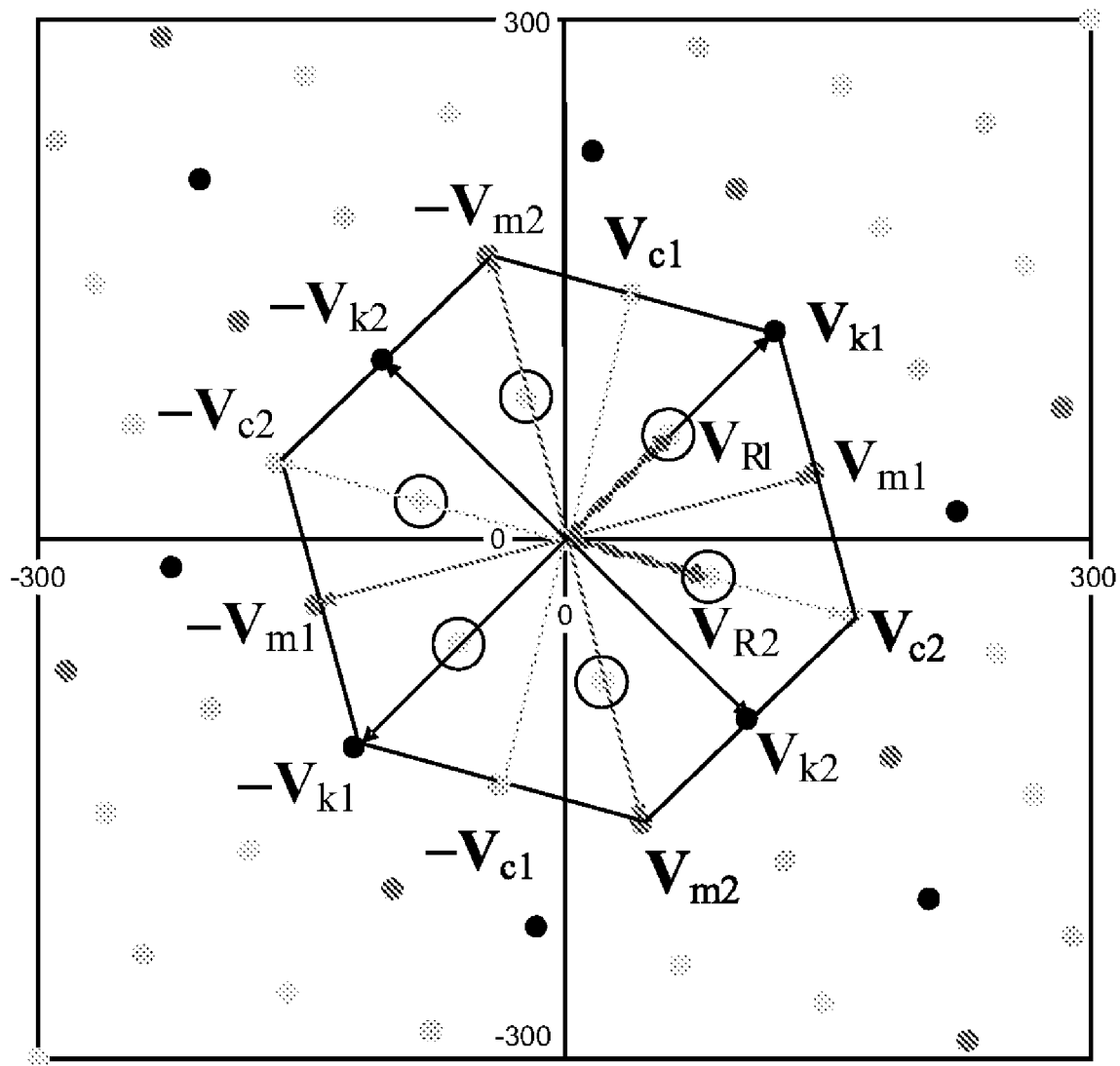
FIG. 10 depicts the Fourier representation of FIG. 9 with the rosette vectors and halftone fundamental spectral hexagon illustrated.

In FIG. 9, the superimposition of the C, M, and K halftone patterns of FIGS. 6, 7 and 8 is shown on the left, and the frequency representation of the superimposition is shown on the right. In the frequency representation, fundamental frequencies and harmonics of each monochromatic screen are illustrated by dots of the color of that screen. Gray dots indicate a frequency formed by the interactions of multiple screens. We see that the rosette of FIG. 9 has a relatively simple, uniform appearance, which results in a pleasing texture.

Besides the pleasant appearance of the rosettes, an interesting observation is that all frequency components, including all fundamental frequencies and the respective harmonics of the monochromatic halftones, and frequencies due to all possible color combinations, can be located a hexagonal grid in the Fourier representation. The hexagonal grid can be seen by drawing a line connecting the nearest neighbors of any point in the spectra.

The halftoning method, and resulting configuration utilized in uniform rosette image resizing method taught herein is based on defining rosette fundamental frequency vectors, of sufficiently high frequency and angle separation, that can be used to generate a hexagonal lattice of rosette harmonics. The lattice is generated by linear combinations of the rosette fundamental frequency vectors. Angles and frequencies for individual halftone screens are chosen from the rosette lattice points. A screen set selected in such a manner is moiré free because no combination of frequency lattice points can produce a beat lower than the two rosette frequency vectors used to generate the lattice. The lattice structure defined by the rosette makes it possible to choose pairs of frequency vectors for an almost arbitrary number of colorants without introducing any moiré in an N-color combination. N-color combinations occur in printing systems that employ N colorants. These printing systems use colorants sets other than simply the conventional CMYK set. For instance, N-color printing systems may include colorants such as orange, green, violet, red, blue, gray, light cyan, light magenta and dark yellow, in addition to the CMYK colorants. N-colorant systems also refers to printing with a smaller set of colorants, such as black and one highlight colorant. Practical frequency lattices can be realized through the use of nonorthogonal screens.

To better understand this rosette vector concept, consider the example of FIG. 9. Rosette vectors $V_{R1}$, $V_{R2}$ shown as red dashed vectors, and the lowest frequency components of the rosette are shown as circles. Note that is it easy to see that the set of lowest frequency components form the vertices of a hexagon. We refer to the hexagon formed by the lowest frequency components as the "first-order spectral hexagon." The relationships between the screen frequency vectors and rosette vectors are given by $$V_{c1} = 2 V_{R1} - V_{R2}$$

$$V_{c2} = 2 V_{R2}$$

$$V_{m1} = V_{R1} + V_{R2}$$

$$V_{m2} = -2 V_{R1} + 2 V_{R2}$$

$$V_{k1} = 2 V_{R1}$$

$$V_{k2} = -V_{R1} + 2 V_{R2}$$

The conjugate fundamental frequency vectors are also shown in FIG. 9. The figure shows that the set of all halftone fundamental frequencies can be connected to form a hexagon, illustrated in FIG. 9 as a thin black line. The halftone fundamental frequencies form the vertices as well as define points that roughly bisect the sides of the hexagon. This hexagon connects the frequency components that lie just outside of the "first-order spectral hexagon. We refer to this hexagon as the "second-order spectral hexagon."

We now turn to teaching equivalent forms of halftone structure representation, such as frequency vectors, spatial vectors and Holladay tile parameters. Knowing one representation and its parameters allows determination of a form that is most convenient for the halftone tile seam manipulation. Due to the rectilinear characteristics of Holladay tile parameters, they are convenient for use in horizontal or vertical resizing. Due to the equivalence in representing halftone structure, within the present disclosure we often simply write "halftone tile parameters."

Rationally angled periodic halftone screens can be represented in several equivalent forms. For instance, the periodic structure is often described by either two spatial vectors or two frequency vectors specifying the frequency and orientation of halftone periodicity. For presenting the teachings herein, a useful representation for halftone periodicity is the replication of rectangular cells with vertical and horizontal sides. For rationally angled periodic screens, Holladay, in U.S. Pat. No. 4,185,304 has shown that there is such a rectangular halftone cell representation that is equivalent to the spatial vector and frequency vector representations. The disclosure found in U.S. Pat. No. 4,185,304 is hereby incorporated by reference in its entirety. The representation of the equivalent rectangular cell requires only three parameters in addition to the threshold values. We use the term "Holladay tile" to denote the tiles associated with halftone tiling utilizing rectangles having vertical and horizontal sides.

Figure 3:
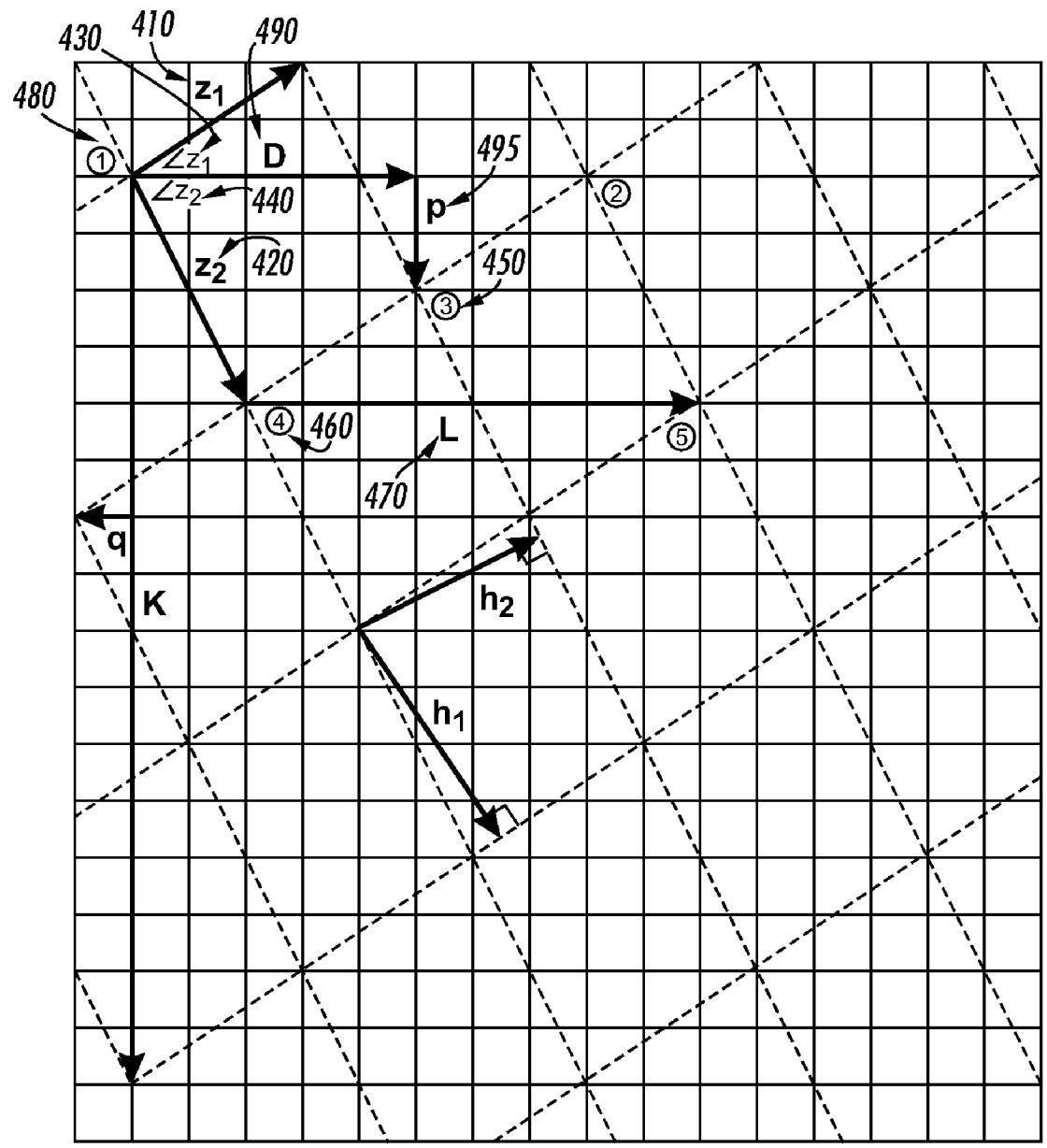
FIG. 3 Schematic depicting relationship between pixels, halftone spatial vector representation, and parameters that relate to Holladay representation.

FIG. 3 teaches the relationship between halftone vector representation, which is often used to represent halftone cells aligned on a rational angle, and rectangular tile representation. Let $z_1$ 410 be the spatial vector located in the first quadrant and let $z_2$ 420 be the frequency vector located in the fourth quadrant. The halftone screen represented by the spatial vectors $z_1$ and $z_2$ can be thought of as the replications of parallelogram halftone cells with sides of length $\|z_1\|$ and $\|z_2\|$ at angles $\angle z_1$ 430 and $\angle z_2$ 440, where $\|z\|$ is the norm of vector z and $\angle z$ is its angle. Let $z_i = (x_i, y_i)$ be the rectangular coordinate representation of the vector whose polar coordinate representation is $(\|z_i\|, \angle z_i)$, for i=1, 2. For a rationally angled halftone screen, $x_i$ and $y_i$ are integers. The area of each parallelogram is $$A = \|(x_1, y_1) \times (x_2, y_2)\| = x_2 y_1 - x_1 y_2, \quad (1)$$

where × is the vector cross-product operator.

Figure 4:
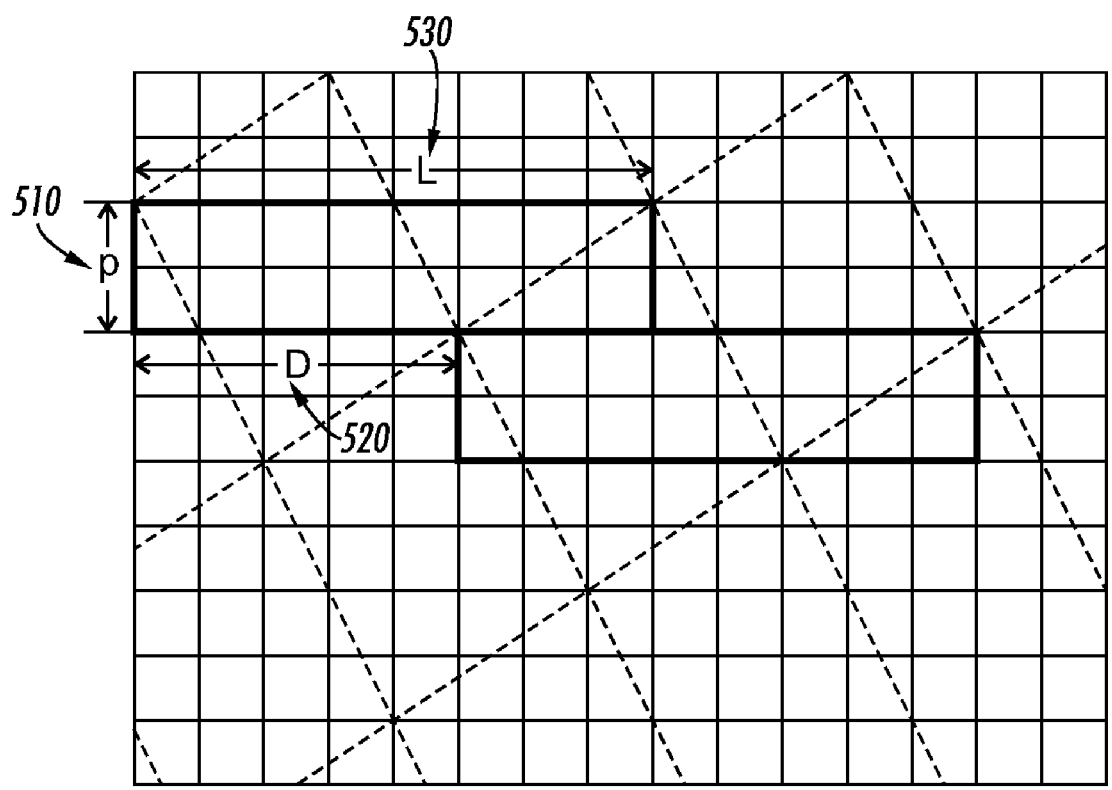
FIG. 4 Schematic depicting relationship between pixels, a rotated halftone screen, a Holladay tile, and the parameters in the Holladay representation.

Alternatively, frequency vectors $f_1$ and $f_2$ may be provided instead of spatial vectors when specifying the halftone screen. Vector $f_i$ is parallel to vector $h_i$, which is the height of the parallelogram perpendicular to vector $z_i$ for i=1, 2 as illustrated in FIG. 4. The magnitude of vector $f_i$ is equal to the reciprocal of the magnitude of vector $h_i$ for i=1, 2.

Let L be the shortest distance along the horizontal axis in which the parallelogram pattern recurs (points 3 450 and 4 460 in FIG. 4), and let L 470 be its corresponding vector. Since L 470 is obtained by following a path along the sides of the parallelogram, it must be the result of the addition of an integer number of vectors $z_1$ 410 and $z_2$ 420. Mathematically, $$L = k z_1 + j z_2, \quad (2)$$

where k and j are the smallest integer values that satisfy the equation. Decomposing Eq. (2) into its components, we get $$L = k x_1 + j x_2, \quad (3)$$

$$0 = k y_1 + j y_2. \quad (4)$$

Let p be the greatest common divisor of $y_1$ and $y_2$. Then $$p = -y_1/j = y_2/k \geq 1. \quad (5)$$

Combining Eq. (5) with Eq. (3) and substituting into Eq. (1) gives area $$A = Lp. \quad (6)$$

Since A and p are known (either $z_1$ 410 and $z_2$ 420 or $f_1$ and $f_2$ are known), L can be calculated.

A similar analysis in the vertical direction yields area $$A = Kq, \quad (7)$$

where K is the shortest vertical distance in which the parallelogram pattern recurs and q is the greatest common divisor of $x_1$ and $x_2$. Since A and q are known, K can be calculated.

Equations (6) and (7) imply that an integer number of trapezoids with area A fit inside a rectangle with dimensions K height and L width. This is an insight into the equivalence between halftone screen representation using rationally-angled trapezoids and representation using Holladay tiles.

Equation (6) implies that the area of one parallelogram is contained in a rectangular block of area A=Lp (see FIG. 4), which must repeat itself a distance of p 510 units in the vertical direction but displaced in the horizontal direction a certain amount D 520 to account for the slant of the original halftone screen so that it falls on the same position in the angled grid defined by the screen (see points 1 and 3 in FIG. 4). In order to get from point 1 480 to point 3 450, a path defined by the vectors D 490 and p 495 may be followed; alternatively, a path obtained by concatenating an integer number of vectors $z_1$ 410 and $z_2$ 420 can also be traced. In mathematical terms, $$D+p=m\,z_1+n\,z_2, \quad (8)$$

which has a unique solution for D 490, m and n if additional constraints such as m≧n and D≦L are imposed. Successive displacements by D 520 in the horizontal direction and p 510 in the vertical direction give the location for the next rectangular cell of horizontal width L 530 with area A. This means that, in effect, a rectangular tile and displacement can represent a rationally-angled screen. The parameters that are needed to uniquely specify a halftone screen using rectangular tiles are L 530, p 510 and D 520.

It should be noted that the above analysis defined a rectangular tiling with a row-to-row displacement in the horizontal direction. As will be appreciated by those skilled in the art it is straightforward to rotate the analysis by 90 degrees to define rectangular tiling with a column-to-column displacement in the vertical direction.

Further, we must note that tiles that directly correspond to halftone frequency vectors can be combined to form larger tiles that fill the image plane. For instance, a halftone defined by a frequency vector of 212 cells/inch at 45° constructed from pixels at 600 per inch corresponds to a Holladay halftone tile that is 2 pixels in height, 4 pixels in width, and offset in successive rows by 2 pixels. Those tiles can be groups in many ways to form larger tiles, sometimes referred to as supercells, or multi-centered cells, that cover the image. One example is that two tiles in a row can be combined to form a dual-dot tile that is 2 pixels by 8 pixels in dimension, and successive rows are offset by 2 pixel. An alternative dual-dot tile can be constructed of tiles on two rows to be 4 pixels by 4 pixels in dimension with an offset of 0 pixels. Those skilled in the art of halftone design can produce many alternative tilings by combining smaller tiles in variations. With respect to the teachings herein, resizing using the smallest possible tile is expected to yield the best image quality due to the fineness of the tile. On the other hand, a tile composed of multiple smaller tiles offers the advantage of reduced computation because a larger number of pixels are affected in each seam manipulation.

The present teachings on equivalent halftone screen representation indicate that a periodic image structure can be represented by rectilinear halftone tiles. Key to the present teaching is the utilization of this representation for uniform rosettes. Uniform rosette image structure, as taught above and in the given references, has been described by pairs of frequency vectors. Hence, a uniform rosette halftone screen configuration also possesses an equivalent tile representation, which can be utilized in resizing color halftone images formed of uniform rosettes.

A descreening step is utilized in one embodiment of the teachings herein to prevent the confounding of the "energy metric" that is used to find low energy halftone tile seams in the image. Content-aware halftone image resizing finds low energy uniform rosette halftone tile seams that can be removed or replicated without drastically changing the appearance of the image, thus producing a graceful resizing of the original image. Descreening produces a continuous-tone (color gray-scale) representation of the input halftone image region and can prevent the presence of halftone texture from interfering with the energy metric. Failure to prevent such texture interference could lead to potentially erroneous decisions as to which regions of the image have the least visible impact on the overall appearance. There are numerous descreening methods that can be utilized by one skilled in the art to obtain a continuous-tone representation of the input halftone image. Examples of methods for descreening are provided in Harrington in U.S. Pat. No. 6,864,994, Fan et al., in U.S. Pat. No. 6,839,152, and De Queiroz et al., in U.S. Pat. No. 5,799,112. The disclosure found in these patents is hereby incorporated by reference in its entirety for their teachings.

Within the present teachings, there are alternative descreening configurations that can be utilized to suppress the uniform rosette halftone texture. In one embodiment, each color separation can be descreened using a descreening filter or method optimized for the halftone frequency vectors of that color separation. This method can be well suited for orthographic images, where color mixing between colorant separations has not occurred. Alternatively, the descreening method can utilize a filter or method optimized for the halftone frequency vectors of the uniform rosette. This method can be used for orthographic images, but may have increased value in a setting where color mixing between colorant separations has occurred, as in a scan of a hardcopy halftone image.

The color content of an image could be received as a set of printer-dependent colorant separations, or as a scan in a scanner-dependent color space. In either case, a mapping from a device-dependent color space to a perceptually uniform color space such as CIE Lab which allows the energy metric to better correspond to perceived image activity. This mapping may be achieved in one of many alternative ways. When the ICC profile information is embedded in the image, the information included in the look-up table that defines profile is used to perform the mapping. When the ICC profile information is missing, and the device is available for characterization, a look-up table can be constructed that performs the mapping. In the case of a printer, the look-up table is constructed by printing patches with different colorant combinations and measuring their Lab values with a spectrophotometer or a calorimeter. This defines a transformation from the printer-dependent color space to CIE Lab at the nodes of the colorant combinations when printing the patches. In the case of having received a scanned image, a test page containing patches with known CIE Lab values is scanned and the corresponding scanner output colors are measured. This defines a transformation from the scanner-dependent color space to CIE Lab at the nodes of the colorant combinations used to form the patches. In either case, for colors in between the look-up table nodes, interpolation techniques may be used to determine the transformation. When the ICC profile information is missing, and the device is unavailable for characterization, conventional formulas for transformation between color spaces may be used as an approximation.

Alternatively, we may directly convert the pixel values within a given uniform rosette halftone tile to perceptually uniform values for that tile. This may be accomplished using area-based models for estimating spectral content of combinations of primaries. An example of such a model is the well known Nuegebauer equations.

A seam is defined as a low energy eight-connected path that traverses the image from top to bottom or from left to right. Eight-connectivity commonly refers to pixels that touch neighboring pixels either on a side or a corner, where it is understood that any flat edge of a tile or pixel is considered a side regardless of orientation. That is, if two pixels are adjacent, either as side-by-side or corner-touching, they are said to be eight-connected. We herein extend the definition of eight-connectivity of pixels, to uniform rosette cells of pixels to refer to a neighboring relationship between two uniform rosette cells where at least one pixel in the first uniform rosette cell is eight-connected to at least one pixel in the second uniform rosette cell. An eight-connected path is defined as an unbroken string of eight-connected pixels or eight-connected uniform rosette cells. A given seam as defined for the purposes of the present disclosure can only have one type of strong connectivity, vertical or horizontal, where strong connectivity refers to side-to-side touching, as opposed to corner touching, which is referred to as weak connectivity. For instance, a seam that traverses an image region from top to bottom may not possess strong horizontal connectivity, and vice versa. Within the teachings provided herein, where the distinction between a seam of pixels and a seam of uniform rosette halftone tiles is important, we refer to a seam constructed of uniform rosette halftone tiles as a "uniform rosette halftone tile seam."

Figure 5:
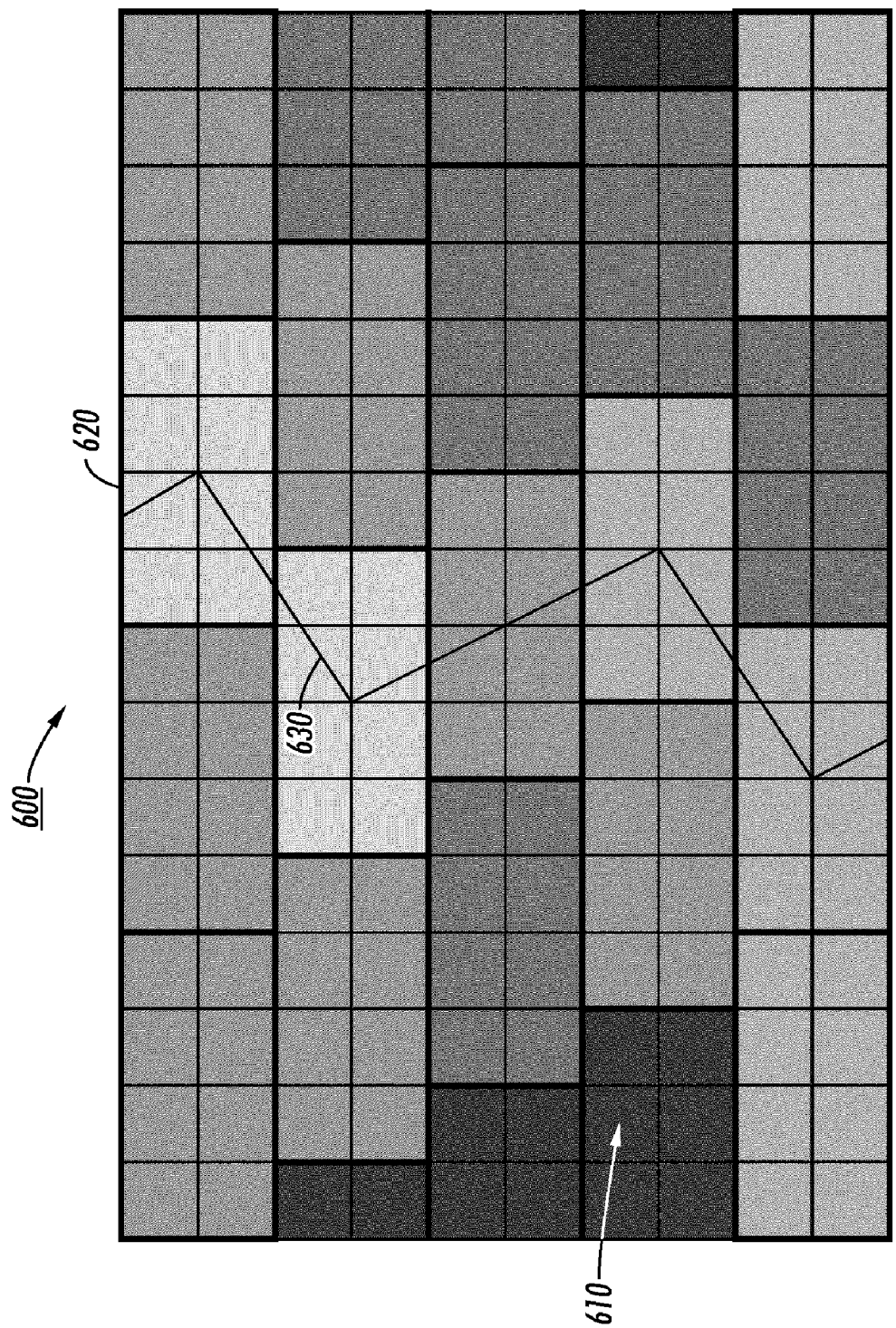
FIG. 5 depicts an example of Holladay halftone tiles and a vertical halftone tile seam connecting low energy tiles.

FIG. 5 illustrates a low energy uniform rosette halftone tile seam running vertically through a section of a digital image. The uniform rosette tiles are formed of 4×8 pixel blocks, where each successive row of blocks is offset by 4 pixels. In the figure, the darkness of a tile represents the energy of that tile. For example, tile 610 is relatively dark and is illustrative of a high energy tile, while tile 620 is relatively light and illustrative of a low energy tile. A vertical low energy halftone tile seam 630 is formed by connecting the centers of low energy uniform rosette halftone tiles along a path from the top of the image section to the bottom of the section. Removing or replicating uniform rosette halftone tiles along this path 630 would have the least noticeable impact on the visual appearance of the image, and thus is desirable for manipulation for resizing.

The optimality of a seam depends on the desired application. In resizing images according to the teachings herein, a desired image size is achieved by repeatedly removing or replicating low energy uniform rosette halftone tile seams that run in the appropriate direction. In this application, the optimality of a uniform rosette halftone tile seam refers to the degree to which it would not be noticed upon removal or replication. In this case, a uniform rosette halftone tile seam is optimal if the pixels or cells that make up the uniform rosette halftone tile seam are located in regions with little activity as measured by an energy metric. By activity, we mean variations in color within a spatial region. A region with high color variation is said to have high activity and would possess a high value energy metric. For continuous tone, monochromatic images, a commonly used energy metric is the image gradient.

A monochromatic image can be seen as a function of two variables, f(x,y) whose value at $(x,y)=(x_0,y_0)$ is the gray value of the pixel located in row $x_0$ and column $y_0$ of the image. In one embodiment of the present teachings herein, the energy metric at each pixel is determined as the magnitude of the local image gradient: the larger the local gradient, the larger the energy at that particular pixel. The gradient of a two-variable function is defined as the two-dimensional vector $$\nabla f(x, y) = \left[\frac{\partial f}{\partial x}, \frac{\partial f}{\partial y}\right], \tag{9}$$

with magnitude $$|\nabla f(x, y)| = \sqrt{\left(\frac{\partial f}{\partial x}\right)^2 + \left(\frac{\partial f}{\partial y}\right)^2}, \tag{10}$$

where $\partial f/\partial x$ and $\partial f/\partial y$ are directional derivatives in the x and y direction, respectively. Directional derivatives can be approximated by applying spatial kernels that compute finite differences. Examples of such spatial kernels are the Prewitt, which are described in "Fundamentals of Digital Image Processing" by A. Jain, Prentice Hall. 1989:

$$\begin{bmatrix} -1 & 0 & 1 \\ -1 & 0 & 1 \\ -1 & 0 & 1 \end{bmatrix}, \begin{bmatrix} -1 & -1 & -1 \\ 0 & 0 & 0 \\ 1 & 1 & 1 \end{bmatrix}, \tag{11}$$

and the Sobel, which are described in "Digital Image Processing," by R. Gonzalez and P. Wintz, Addison-Wesley Publishing Company, $2^{nd}$ Edition, 1987:

$$\begin{bmatrix} -1 & 0 & 1 \\ -2 & 0 & 2 \\ -1 & 0 & 1 \end{bmatrix}, \begin{bmatrix} -1 & -2 & -1 \\ 0 & 0 & 0 \\ 1 & 2 & 1 \end{bmatrix}. \tag{12}$$

The Laplacian, also described in the books by Jain, and Gonzalez and Wintz, is another measure of local energy that is less computationally expensive since it only requires the application of one kernel. Mathematically, it is defined as $$\nabla^2 f(x, y) = \frac{\partial^2 f}{\partial x^2} + \frac{\partial^2 f}{\partial y^2}, \tag{13}$$

and can be approximated with the kernel $$\begin{bmatrix} 0 & 1 & 0 \\ 1 & -4 & 1 \\ 0 & 1 & 0 \end{bmatrix}. \tag{14}$$

However, due to the second-order derivative, the Laplacian operator is more sensitive to noise than the gradient operators.

The gradient-based metric should be applied to halftone images that have been de-screened, as direct calculation of the image gradient on halftone images may yield misleading results that depend on the halftone structure as well as on the image activity. In one embodiment of the teachings herein, we generalize the concept of the image gradient to halftone color images by mapping the continuous tone image (obtained by applying a de-screening filter to the color image) from device-dependent spaces such as RGB or CMYK to a perceptually uniform space such as CIE Lab and computing the gradient on each color plane separately. The pixel energy can then be approximated by either the local gradient in the luminance plane only, as it is the most perceptually relevant of the three, or by merging the energy in each of the three planes via a vectorial norm such as the $L_2$ norm. Other more elaborate alternatives for calculating the pixel color gradient such as the weighted gradient that compute the gradient based on the distance of the colors inside a given connected region, or metrics based on tensorial algebra that use tensors to represent colors in an image and calculate gradients by calculating the dissimilarity among the tensors may also be used. An example of gradients within color images can be found in the publication by Rittner, Flores, and Lotufo, entitled "New Tensorial Representation of Color Images: Tensorial Morphological Gradient Applied to Color Image Segmentation," SIBGRAPI 2007, XX Brazilian Symposium on Computer Graphics and Image Processing, 2007, pages 45-52.

The energy metrics used for determining low energy seams discussed thus far have been derived from a contone image representation of the received uniform rosette halftone image. It is within the scope of the teachings herein to alternatively derive energy metrics and low energy uniform rosette halftone tile seams directly from the uniform rosette halftone image. For instance, a measure of rosette-to-rosette difference is an energy metric. A useful rosette-to-rosette difference metric is a count of the number of pixels within a rosette that are of a different state than corresponding pixels within its neighboring rosettes. Stated mathematically, $$E = \sum_l \sum_k \sum_{i,j} (C_l(i,j)) XOR(N_{kl}(i,j)),$$

where E is the energy of the rosette C, $C_l(i, j)$ are the halftone pixel values of the rosette at positions i, j within colorant separation l, and $N_{kl}(i, j)$ are the halftone pixel values of the rosette at corresponding positions i, j within the colorant separation l of the kth neighboring rosette, and XOR is the Exclusive OR operation.

Note that other contone energy metrics may be used within the present teachings, for example functions of the gradient, entropy, visual saliency, eye-gaze movement, Harris corners, output of face detectors, and other specific feature detectors as discussed by Avidan and Shamir in "Seam Carving for Content-Aware Image Resizing" ACM Transactions on Graphics, Volume 26, Number 3, SIGGRAPH 2007.

One method to determine an optimal seam from energy metrics, is to employ an exhaustive search that calculates the energy of every possible seam that originates at each pixel or cell of the first row (column) of the image. A more computationally efficient alternative approach is to use a dynamic programming method, because it can eliminate redundancy within the exhaustive approach. This redundancy is present because seams originating at neighboring pixels (or cells) may have multiple pixels (or cells) in common. Dynamic programming is well known in the field of computer algorithm design.

At each iteration, the dynamic programming approach traverses the energy map row by row to define vertical seams or column by column to define horizontal seams and finds the cumulative minimum energy at each pixel or cell of each row (or column). At the end of the process for determining vertical seams, the smallest value on the last row indicates the end point of the optimal path that traverses the image from top to bottom. At the end of the process for determining horizontal seams, the smallest value on the last column indicates the end point of the optimal path that traverses the image from left to right. The remaining pixels (or cells) that belong to the seam are found by traversing the energy map in the opposite direction and picking the neighboring pixel (or cell) with the smallest cumulative energy in each subsequent adjacent row for vertical seams or column for horizontal seams.

Once a low energy halftone tile seam is found, it will need to be replicated or removed as depending on the resizing factor. To achieve acceptable visual appearance a uniform rosette halftone tile seam does not need to possess the absolute lowest energy to be selected for replication or deletion. It is sufficient for the uniform halftone tile seam to possess relatively low energy as can be determined via an energy threshold. For example, uniform rosette halftone tile seams possessing energy below a threshold of 5% above the minimum seam energy as determined from the image can be selected for manipulation.

As previously noted, replicating or removing a single arbitrary pixel in a row or in a column of a uniform rosette halftone image will introduce resizing streaks. In order to avoid the introduction of artifacts, the presently taught method manipulates low energy seams constructed of cells, rather than pixels. Resizing factors greater than 1 require low energy uniform rosette halftone tile seam replication while resizing factors less than 1 require low energy uniform rosette halftone tile seam deletion. A resizing factor that does not equal 1 in the vertical direction requires manipulation of horizontal low energy uniform rosette halftone tile seams, while a resizing factor that does not equal 1 in the horizontal direction requires manipulation of vertical low energy uniform rosette halftone tile seams. Resizing factors not equal to 1 may be provided for each orientation, and low energy uniform rosette halftone tile seam manipulation could proceed in serial, one orientation after the other, or low energy uniform rosette halftone tile seam manipulation could alternate between directions until the adequate number of low energy uniform rosette halftone tile seams is manipulated for each orientation.

Let the height of the halftone cell be p pixels and its width L pixels. Then at each iteration of low energy uniform rosette halftone tile seam manipulation for a resizing factor less than 1, the removal of a low energy uniform rosette halftone tile seam results in the removal of p pixels for vertical manipulation and L for horizontal manipulation. Similarly, at each iteration of low energy uniform rosette halftone tile seam manipulation for a resizing factor greater than 1, the replication of a low energy uniform rosette halftone tile seam results in the replication of p pixels for vertical manipulation and L for horizontal manipulation. Thus, the image is decreased or increased in height or width by multiple pixels in each iteration. This implies that if it is desired to decrease or increase the height or width of the image by m pixels, the process needs to be iterated [m/p] times for vertical manipulation and [m/L] times for horizontal manipulation, where [•] denotes the rounding operator, which approximates to the nearest integer. Alternatively, other rounding approaches, such as the nearest lower integer or nearest higher integer may be also be used. Thus, low energy uniform rosette halftone tile seam removal can achieve the desired resizing to the accuracy of the dimensions of a tile since a tile is the unit of manipulation.

As we have noted, typically, multiple low energy uniform rosette halftone tile seams must be manipulated to achieve the desired resizing. There are several alternatives within the scope of the present teaching for removing multiple low energy uniform rosette halftone tile seams. The alternatives exist because removing one or more seams can affect the energy metrics of other seams. The alternatives are important because some offer the advantage of a lower burden of computation, while other alternatives may provide better image quality, and yet other alternatives are a compromise between computational burden and optimal image quality.

A method for selecting multiple low energy seams that has a low computational burden employs a one-time calculation of seam energy. That is, the energy for many uniform rosette halftone tile seams may be calculated one time, and the appropriate number of low energy uniform rosette halftone tile seams can be selected from uniform rosette halftone tile seams possessing lowest values using the energy of the seams determined from the one-time calculation. When removing multiple seams based on a one-time energy calculation, it must be noted that a uniform rosette halftone tile can be a member of one or more seams. When this situation occurs, the seam is manipulated that possesses the lowest energy. The other seams that contain this tile are then not manipulated.

In terms of perceived image quality, a very high quality resizing produces an output that introduces the least abrupt density variation due to seam removal. A method for selecting multiple low energy seams that has the potential for achieving the highest image quality recalculates seam energy after each manipulation of a low energy uniform rosette halftone tile seam. This method ensures that the absolute lowest energy seam may be removed. Additionally, the issue of a tile belonging to two or more seams having low energy does not occur.

Alternative methods for removing multiple seams are a compromise between computational burden and optimal image quality. One of these compromise methods recalculates seam energy after a fixed number of low energy uniform rosette halftone tile seams have been manipulated. Another compromise approach to recalculating seam energy is to recalculate the energy when the next lowest energy uniform rosette halftone tile seam that has not been removed is sufficiently different in energy from low energy uniform rosette halftone tile seams previously removed. There are several ways that the difference can be determined. One method calculates the difference in energy with respect to the lowest energy seam found in the most recent seam energy calculation. Another method determines difference with respect to the highest energy seam removed thus far. Other differences may also be useful to consider, such as difference with respect to the mean energy of seam removed thus far. Differences on the order of, say 5% or great may merit an energy recalculation.

There are also several alternatives within the scope of the present teaching for replicating multiple low energy uniform rosette halftone tile seams. For example, one low energy uniform rosette halftone tile seam possessing the lowest or relatively low energy (for example, within 5% of the minimum energy seam) could be replicated until the resizing is achieved. For some image types it could be desirable to choose low energy uniform rosette halftone tile seams for replication that are spatially separated so that a noticeable band of low energy is not inserted into the image. In this situation, some number of spatially separated low energy uniform rosette halftone tile seams could be replicated to achieve the desired resizing. For example, it can be desirable to replicate low energy uniform rosette halftone tile seams that are separated by 3 or more uniform rosette halftone tiles.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for resizing a digital uniform rosette halftone image composed of multiple colorant separations, the method comprising:
   receiving into a digital imaging system, a digital uniform rosette halftone image and a desired resizing factor for the digital uniform rosette halftone image;
   defining uniform rosette cells within the uniform rosette digital halftone image;
   determining from the defined uniform rosette cells, a subset of uniform rosette halftone tile seams to manipulate, where the orientation of each of the uniform rosette halftone tile seams is dictated by the received desired resizing factor;
   determining an energy map of the digital uniform rosette halftone image according to an energy metric derived from the multiple colorant separations;
   determining an energy for each of the seams within the energy map so as to provide indication as to which seams have low energy;
   resizing of the uniform rosette halftone image by manipulating at least one of the uniform rosette halftone tile seams having low energy to obtain a resized uniform rosette halftone image; and
   printing the resized uniform rosette halftone image on a printer.

2. The method of claim 1 wherein the multiple colorant separations are a set taken from the group cyan, magenta yellow, black, red, green, blue, violet, gray, light magenta, light cyan, and dark yellow.

3. The method of claim 2 where the methodology is only applied to a sub-region of the digital uniform rosette halftone image.

4. The method of claim 2 where at least one of the low energy determined uniform rosette halftone tile seam possesses energy below an energy threshold.

5. The method of claim 4 where the energy threshold is 5% greater than the lowest energy determined for any of the uniform rosette halftone tile seams.

6. The method of claim 4 wherein manipulating at least one of the uniform rosette halftone tile seams having low energy comprises a replication operation for increasing the size of the digital uniform rosette halftone image.

7. The method of claim 4 wherein manipulating at least one of the uniform rosette halftone tile seams having low energy comprises a deletion operation for decreasing the size of the digital uniform rosette halftone image.

8. The method of claim 6 wherein manipulating at least one of the uniform rosette halftone tile seams having low energy comprises a replication operation for a resizing factor greater than 1.

9. The method of claim 7 wherein manipulating at least one of the uniform rosette halftone tile seams having low energy comprises a deletion operation for a resizing factor less than 1.

10. The method of claim 4 wherein a number of the low energy uniform rosette halftone tile seams are manipulated such that the resized uniform rosette halftone image possesses a size dictated by the resizing factor within a multiple of the dimensions of a uniform rosette halftone tile.

11. The method of claim 4 wherein defining the uniform rosette halftone cells utilizes uniform rosette halftone screen parameters and the parameters are derived from one of auto-correlation, frequency analysis, wavelet decomposition, or directly receiving the screen parameters.

12. The method of claim 11 wherein the parameters defining the uniform rosette halftone cells are used to derive a Holladay tile representation of the uniform rosette cells comprising a width, height and offset for the uniform rosette cells, and the number of low energy uniform rosette halftone tile seams are constructed of Holladay uniform rosette halftone tiles.

13. The method of claim 4 wherein the energy map is derived from one of: color gradients in each plane in a color space, and calculating the dissimilarity among tensorial representations of colors.

14. The method of claim 13 wherein the uniform rosette halftone tile seam is determined by calculating a low energy pixel seam and quantizing the pixel seam to the uniform rosette halftone tile seam within the energy map.

15. The method of claim 4 wherein the energy map is determined by directly calculating tile-to-tile differences and the difference is summed across the color planes.

16. The method of claim 4 wherein the energy map is by estimating the difference of spectral content of the primary colorant combination of each uniform rosette tile.

17. The method of claim 4 wherein the energy of the uniform rosette halftone tile seam within the energy map is determined by integrating the energy of eight-connected cells along the seam that traverses the image in the direction dictated by the resizing factor.

18. The method of claim 8 wherein the low energy is defined to be seam energy within 5% of the minimum seam energy.

19. The method of claim 18 wherein the low energy uniform rosette halftone tile seams that are separated by at least the width of three tiles are replicated until the resizing is achieved.

20. The method of claim 4, wherein the energy of the uniform rosette halftone tile seams is determined according to an energy metric employing one of: an exhaustive search, and employing a dynamic programming method.

21. A method for resizing a digital uniform rosette halftone image composed of multiple colorant separations, the method comprising:
receiving into a digital imaging system, a digital uniform rosette halftone image and a desired resizing factor for the digital uniform rosette halftone image;
determining uniform rosette halftone screen parameters for the digital uniform rosette halftone image;
defining uniform rosette cells within the digital uniform rosette halftone image from the determined uniform rosette halftone screen parameters;
determining from the defined uniform rosette cells and the uniform rosette halftone cell parameters, a number of uniform rosette halftone tile seams to manipulate, where the orientation of the uniform rosette halftone tile seams is dictated by the received desired resizing factor;
determining an energy map of the digital uniform rosette halftone image according to an energy metric derived from the multiple colorant separations;
determining an energy for each of the uniform rosette halftone tile seams within the energy map so as to provide indication as to which of the uniform rosette halftone tile seam have low energy;
resizing of the uniform rosette halftone image by manipulating the low energy uniform rosette halftone tile seams to obtain a resized uniform rosette halftone image; and
printing the resized uniform rosette halftone image on a printer.

22. The method of claim 21 wherein the multiple colorant separations are taken from the group cyan, magenta yellow, black, red, green, blue, violet, gray, light magenta, light cyan, and dark yellow.

23. The method of claim 21 further comprising the steps of: descreening the digital halftone image to provide descreened pixel values; and determining the energy metric from the descreened pixel values.

24. The method of claim 21 where the methodology is only applied to a sub-region of the digital uniform rosette halftone image.

25. The method of claim 21 wherein at least one of the low energy uniform rosette halftone tile seam possesses energy below an energy threshold.

26. The method of claim 21 where the energy metric determined for locations within the uniform rosette halftone image forms the energy map.

27. The method of claim 25 where the energy threshold is 5% greater than the lowest energy determined for any of the number of uniform rosette halftone tile seams.

28. The method of claim 25 wherein manipulating of at least one of the low energy uniform rosette halftone tile seams comprises a replication operation for increasing the size of the digital uniform rosette halftone image.

29. The method of claim 25 wherein manipulating of at least one of the low energy uniform rosette halftone tile seams comprises a deletion operation for decreasing the size of the digital uniform rosette halftone image.

30. The method of claim 25 wherein the number of the low energy uniform rosette halftone tile seams are manipulated such that the resized uniform rosette halftone image possesses a size dictated by the resizing factor within a multiple of the dimensions of a uniform rosette halftone tile.

31. The method of claim 25 wherein the halftone screen parameters defining the uniform rosette halftone cells are used to derive a Holladay tile representation of the uniform rosette cells comprising a width, height and offset for the uniform rosette cells, and the number of low energy uniform rosette halftone tile seams are constructed of Holladay uniform rosette halftone tiles.

32. The method of claim 25 wherein the energy map is derived from one of: color gradients in each plane in a color space, and calculating the dissimilarity among tensorial representations of colors.

33. The method of claim 32 wherein the uniform rosette halftone tile seam is determined by calculating a low energy pixel seam and quantizing the pixel seam to the uniform rosette halftone tile seam within the energy map.

34. The method of claim 22 wherein the energy map is determined by directly calculating tile-to-tile differences and the difference is summed across the color planes.

35. The method of claim 24 wherein the energy map is determined by estimating the difference of spectral content of the primary colorant combination of each uniform rosette tile.

36. The method of claim 26 wherein the energy of the uniform rosette halftone tile seam within the energy map is determined by integrating the energy of eight-connected uniform rosette cells along the seam that traverses the image in the direction dictated by the resizing factor.

37. A method for resizing a digital uniform rosette halftone image composed of multiple colorant separations, the method comprising:
receiving into a digital imaging system, a digital uniform rosette halftone image and a desired resizing factor for the digital uniform rosette halftone image;
defining uniform rosette cells within the digital uniform rosette halftone image;

determining from the defined uniform rosette cells, a number of uniform rosette halftone tile seams to manipulate, where the orientation of the number of uniform rosette halftone tile seams is dictated by the received desired resizing factor;

descreening each colorant separation of the digital uniform rosette halftone image to provide descreened pixel values;

determining an energy metric from the descreened pixel values to provide an energy map;

determining the energy of the number of uniform rosette halftone tile seams according to an energy map so as to indicate of a number of low energy determined uniform rosette halftone tile seams, the number at least sufficient to achieve the desired resizing factor for the digital uniform rosette halftone image;

resizing of the uniform rosette halftone image by manipulating the number of low energy determined uniform rosette halftone tile seams to obtain a uniform rosette resized halftone image; and printing the resized uniform rosette halftone image on a printer.

38. The method of claim 37 where the methodology is only applied to a sub-region of the digital uniform rosette halftone image.

39. The method of claim 37 where the energy metric is based on the gradient of luminance.

40. The method of claim 37 where the number of low energy determined uniform rosette halftone tile seams are uniform rosette halftone tile seams that possess energy below an energy threshold.

41. The method of claim 40 where the energy threshold is 5% greater than the lowest energy determined for any of the uniform rosette halftone tile seams.

42. The method of claim 40 wherein manipulating at least one of the low energy determined halftone tile seams comprises a replication operation for increasing the size of the digital uniform rosette halftone image.

43. The method of claim 40 wherein manipulating of at least one of the low energy uniform rosette halftone tile seams comprises a deletion operation for decreasing the size of the digital uniform rosette halftone image.

44. The method of claim 37, wherein the received uniform rosette halftone image is one of: orthographic and a scan of a hardcopy halftone image.

\* \* \* \* \*